United States Patent
Keating et al.

(10) Patent No.: US 7,697,792 B2
(45) Date of Patent: Apr. 13, 2010

(54) PROCESS-RESPONSE STATISTICAL MODELING OF A VISUAL IMAGE FOR USE IN DETERMINING SIMILARITY BETWEEN VISUAL IMAGES

(75) Inventors: Brett M. Keating, San Jose, CA (US); Subutai Ahmad, Palo Alto, CA (US)

(73) Assignee: YesVideo, Inc., Santa Clara, CA (US)

( * ) Notice: Subject to any disclaimer, the term of this patent is extended or adjusted under 35 U.S.C. 154(b) by 1210 days.

(21) Appl. No.: 11/176,010

(22) Filed: Jul. 5, 2005

(65) Prior Publication Data
US 2006/0015496 A1 Jan. 19, 2006

(51) Int. Cl.
*G06K 9/54* (2006.01)
*G06K 9/00* (2006.01)

(52) U.S. Cl. ...................... 382/305; 382/162
(58) Field of Classification Search ................. 382/305, 382/162–167, 168–170, 224–228, 276–300; 707/1–7, 104.1; 345/589–591
See application file for complete search history.

(56) References Cited

U.S. PATENT DOCUMENTS

| | | | | |
|---|---|---|---|---|
| 5,579,471 | A | 11/1996 | Barber et al. | 395/326 |
| 6,009,204 | A | 12/1999 | Ahmad | 382/236 |
| 6,181,817 | B1 | 1/2001 | Zabih et al. | 382/170 |
| 6,259,817 | B1 | 7/2001 | Ahmad | 382/236 |
| 6,470,333 | B1 | 10/2002 | Baclawski | 707/3 |
| 6,522,779 | B2 | 2/2003 | Pass et al. | 382/170 |
| 6,522,780 | B1* | 2/2003 | Pass et al. | 382/170 |
| 6,829,384 | B2 | 12/2004 | Schneiderman et al. | 382/154 |
| 7,379,627 | B2* | 5/2008 | Li et al. | 382/305 |

OTHER PUBLICATIONS

"Color indexing," M. Swain and D. Ballard, International Journal of Computer Vision, vol. 7, No. 1, pp. 11-32, 1991.
"Color Indexing with Weak Spatial Constraints," M. Stricker and A. Dimai, Proceedings of SPIE Storage and Retrieval of Still Image and Video Databases IV, vol. 2670, pp. 29-40, Feb. 1996.
"Image Retrieval using Color and Shape," A. Jain and A. Vailaya, Pattern Recognition, vol. 29, No. 8, pp. 1233-1244, Aug. 1996.
"Blobworld: A System for Region-Based Image Indexing and Retrieval," C. Carson, M. Thomas, S. Belongie, J. Hellerstein and J. Malik, Proceedings of the Third International Conference on Visual Information and Information Systems, pp. 509-516, Jun. 2-4, 1999.
"Clustering by Competitive Agglomeration," H. Frigui and R. Krishnapuram, Pattern Recognition, vol. 30, No. 7, pp. 1109-1119, 1997.
"Histogram Refinement for Content-Based Image Retrieval," by G. Pass and R. Zabih, Proceedings of the 3rd IEEE Workshop on Applications of Computer Vision, pp. 96-102, 1996.

(Continued)

*Primary Examiner*—Sherali Ishrat
(74) *Attorney, Agent, or Firm*—David R. Graham

(57) ABSTRACT

Process-response statistical modeling of visual images can be used in determining similarity between visual images. Evaluation of the content of visual images—and, in particular, image similarity determinations—can be used in effecting a variety of interactions (e.g., indexing, grouping, summarizing, annotating, searching keyframing) with a collection of visual images.

42 Claims, 6 Drawing Sheets

OTHER PUBLICATIONS

"VisualSEEk: a fully automated content-based image query system," by J. Smith and S.-F. Chang, Proceedings of ACM Multimedia 96, pp. 87-98, 1996.

"Image Indexing Using Color Correlograms," by J. Huang, S. R. Kumar, M. Mitra, W.-J. Zhu and R. Zabih, Proceedings of the 1997 IEEE Computer Society Conference on Computer Vision and Pattern Recognition, pp. 762-768, 1997.

"Spatial Color Indexing and Applications," by J. Huang, S. R. Kumar, M. Mitra and W.-J. Zhu, Proceedings of the Sixth International Conference on Computer Vision, pp. 602-607, Jan. 4-7, 1998.

"Images Similarity Detection Based on Directional Gradient Angular Histogram," by J. Peng, B. Yu and D. Wang, Proceedings of the $16^{th}$ International Conference on Pattern Recognition, vol. 1, pp. 147-150, 2002.

"Local Appearance-Based Models using High-Order Statistics of Image Features," by B. Moghaddam, D. Guillamet and J. Vitria, Proceedings of the 2003 IEEE Computer Society Conference on Computer Vision and Pattern Recognition, vol. 1, pp. I-729-I-735, Jun. 18-20, 2003.

"Probabilistic Modeling of Local Appearance and Spatial Relationships for Object recognition," by H. Schneiderman and T. Kanade, Proceedings of the 1998 IEEE Computer Society Conference on Computer Vision and Pattern Recognition, pp. 45-51, Jun. 1998.

"Image Indexing and Retrieval Based on Human Perceptual Color Clustering," by Y. Gong, G. Proietti and C. Faloutsos, Proceedings of the 1998 IEEE Computer Society Conference on Computer Vision and Pattern Recognition, Jun. 23-25, 1998.

"A multiresolution color clustering approach to image indexing and retrieval," by X. Wan and C.-C. J. Kuo, Proceedings of the 1998 IEEE International Conference on Acoustics, Speech and Signal Processing, vol. 6, pp. 3705-3708, May 1998.

"Integrating Color, Texture, and Geometry for Image Retrieval," by N. Howe and D. Huttenlocher, Proceedings of the 2000 IEEE Computer Society Conference on Computer Vision and Pattern Recognition, pp. 239-247, 2000.

"Percentile Blobs for Image Similarity," by N. Howe, Proceedings of the IEEE Workshop on Content-Based Access of Image and Video Databases, pp. 78-83, Jun. 21, 1998.

"SIMPLIcity: Semantics-Sensitive Integrated Matching for Picture Libraries," by J. Wang, J. Li and G. Wiederhold, IEEE Transactions on Pattern Analysis and Machine Intelligence, pp. 947-963, 2001.

"Object Class Recognition by Unsupervised Scale-Invariant Learning," by R. Fergus, P. Perona and A. Zisserman, Proceedings of the 2003 IEEE Computer Society Conference on Computer Vision and Pattern Recognition, vol. 2, pp. II-264-II-271, Jun. 18-20, 2003.

"Temporal Event Clustering for Digital Photo Collections," by Matthew Cooper et al., Proceedings of the 11th ACM International Conference on Multimedia, pp. 364-373, Nov. 2003.

* cited by examiner

| HISTOGRAM A | HISTOGRAM B | DIFFERENCE |
|---|---|---|
| 0.01 | 0 | 0.01 |
| 0.04 | 0 | 0.04 |
| 0.09 | 0 | 0.09 |
| 0.18 | 0.03 | 0.15 |
| 0.22 | 0.07 | 0.15 |
| 0.23 | 0.11 | 0.12 |
| 0.24 | 0.19 | 0.05 |
| 0.26 | 0.2 | 0.06 |
| 0.29 | 0.25 | 0.04 |
| 0.36 | 0.29 | 0.07 |
| 0.55 | 0.33 | 0.22 |
| 0.62 | 0.45 | 0.17 |
| 0.63 | 0.6 | 0.03 |
| 0.65 | 0.7 | 0.05 |
| 0.72 | 0.8 | 0.08 |
| 0.77 | 0.91 | 0.14 |
| 0.8 | 0.94 | 0.14 |
| 0.85 | 0.95 | 0.1 |
| 0.88 | 0.96 | 0.08 |
| 0.95 | 0.96 | 0.01 |
| 0.96 | 0.97 | 0.01 |
| 0.99 | 1 | 0.01 |
| 0.99 | 1 | 0.01 |
| 1 | 1 | 0 |
| 1 | 1 | 0 |
| 1 | 1 | 0 |
| 1 | 1 | 0 |
| 1 | 1 | 0 |
| 1 | 1 | 0 |
| 1 | 1 | 0 |
| 1 | 1 | 0 |
| | SUM OF DIFF: | 1.83 |

FIG. 5

PROCESS-RESPONSE STATISTICAL MODELING OF A VISUAL IMAGE FOR USE IN DETERMINING SIMILARITY BETWEEN VISUAL IMAGES

BACKGROUND OF THE INVENTION

1. Field of the Invention

This invention relates to evaluating the content of visual images, in particular, to determining similarity between visual images, and, most particularly, to the use of process-response statistical modeling of visual images in determining similarity between visual images. The invention also relates to making use of visual image content evaluation—and, in particular, image similarity determinations—in effecting interaction (e.g., indexing, grouping, summarizing, annotating, searching, keyframing) with a collection of visual images.

2. Related Art

Most image similarity methods can be roughly divided into two categories, although some current methods can blur the distinction between those categories. The first category consists of methods that compute some statistical profile of the visual images, then perform comparisons between statistical profiles. The second category consists of methods that locate features in the visual images and, perhaps, quantify the relationships between features in the visual images, then compare the two visual images, often by examining both the difference in the types of features present in the two visual images, as well as the difference in how the features are related (spatially or otherwise) in the two visual images.

One of the earliest and most commonly used statistical methods is the color histogram, as described in, for example, "Color indexing," by M. Swain and D. Ballard, International Journal of Computer Vision, 7(1):11-32, 1991, the disclosure of which is hereby incorporated by reference herein. This method quantizes the colors in a visual image, in some color space, and determines how frequently colors occur by computing a histogram that describes the distribution. Two visual images are then compared through comparison of their color distributions, i.e., color histograms. The main problem with this approach is that the spatial relationship between colors is not captured, although a great advantage is invariance to affine transforms. Some attempts have been made to incorporate some spatial information into the decision-making process. Examples of such attempts are described in the following documents, the disclosure of each of which is hereby incorporated by reference herein: 1) "Histogram refinement for content-based image retrieval," by G. Pass and R. Zabih, IEEE Workshop on Applications of Computer Vision, pages 96-120, 1996; 2) "Color indexing with weak spatial constraints," by M. Stricker and A. Dimai, SPIE Proceedings, 2670:29-40, 1996; and 3) "Visualseek: a fully automated content-based image query system," by J. R. Smith and S. F. Chang, In Proc. of ACM Multimedia 96, 1996.

A method that aims to improve upon the color histogram is known as the color correlogram, described in "Image indexing using color correlograms," by J. Huang, S. R. Kumar, M. Mitra, W.-J. Zhu and R. Zabih, In Proc CVPR '97, 1997, the disclosure of which is hereby incorporated by reference herein. This method constructs a histogram-like structure that gives the probability distribution that a particular color has a pixel of another color a certain distance away. The full color correlogram can be especially large, $O(N^2 D)$ in size, where N is the number of colors after quantization and D is the range of distances. The auto-correlogram, which only measures the probability that the same color pixel is a certain distance away for each color, is $O(ND)$ in size, but, though more reasonable in size, is less effective. Other extensions to the color correlogram attempt to incorporate edge information, as described in, for example, "Spatial color indexing and applications," by J. Huang, S. R. Kumar, M. Mitra and W.-J. Zhu, In ICCV '98, Bombay, India, 1998, the disclosure of which is hereby incorporated by reference herein.

Another statistical method is the edge orientation histogram, as described in, for example, "Images Similarity Detection Based on Directional Gradient Angular Histogram," by J. Peng, B. Yu and D. Wang, Proc. $16^{th}$ Int. Conf. on Pattern Recognition (ICPR '02), and "Image Retrieval using Color and Shape," A. K. Jain and A. Vailaya, Patt Recogn, 29(8), 1996, the disclosure of each of which is hereby incorporated by reference herein. This method constructs a histogram that describes the probability of a pixel having a particular gradient orientation. The advantage of using orientation only is that statistics about the general shape tendencies in the visual image are captured, without being too sensitive to image brightness or color composition. Although it is generally good to be insensitive to brightness, it can be a disadvantage at times to completely ignore color.

Another statistical method involves computing feature vectors at several locations in the visual image, where the locations can be discovered through a simple salient region (i.e., regions of a visual image that tend to capture a viewer's attention) detection scheme, as described in, for example, "Local Appearance-Based Models using High-Order Statistics of Image Features," by B. Moghaddam, D. Guillamet and J. Vitria, In Proc. CVPR '03, 2003, the disclosure of which is hereby incorporated by reference herein. The features are not placed in histograms, but, rather, into a joint probability distribution which is used as a prior for object detection. The authors allude to computing feature vectors for visual images subdivided into blocks, but do not explore the idea nor suggest the use of a histogramming method. Another similar method is mentioned in "Probabilistic Modeling of Local Appearance and Spatial Relationships for Object recognition," by H. Schneiderman and T. Kanade, In Proc. CVPR '98, 1998, the disclosure of which is hereby incorporated by reference herein. The fundamental idea of these methods is to represent low-level features in a probability distribution. The goals of these methods differ from those of the present invention in that the present invention is designed for determining image similarity while these methods are intended for specific object recognition purposes.

As indicated above, other methods attempt to find features in the visual images and describe the features in such a way that the features can be compared between visual images. Many of these methods also describe the relationships (spatial or otherwise) among the features and make use of that information as well in identifying similarities between visual images.

Several methods use image segmentation or color clustering to determine prominent color regions in the visual image. Examples of such methods are described in the following documents, the disclosure of each of which is hereby incorporated by reference herein: 1) "Image indexing and retrieval based on human perceptual color clustering," by Y. Gong, G. Proietti and C. Faloutsos, In Proc. CVPR '98, 1998; 2) "A multiresolution color clustering approach to image indexing and retrieval," by X. Wan and C. J. Kuo, In Proc. IEEE Int. Conf. Acoustics, Speech, Signals Processing, vol. 6, 1998; 3) "Integrating Color, Texture, and Geometry for Image Retrieval," by N. Howe and D. Huttenlocher, In Proc. CVPR 2000, 2000; 4) "Percentile Blobs for Image Similarity," by N. Howe, IEEE Workshop on Content-Based Access of Image and Video Databases, 1998; 5) "Blobworld: A System for Region-Based Image Indexing and Retrieval," by C. Carson, M. Thomas, S. Belongie, J. M. Hellerstein and J. Malik, Proc. Visual Information Systems, pp. 509-516, June 1999; and 6) "Simplicity: Semantics-sensitive integrated matching for picture libraries," by J. Z. Wang, Jia Li and Gio Wiederhold, IEEE Transactions on Pattern Analysis and Machine Intelligence (PAMI), 2001. The general approach is to divide the visual image into salient regions, compute a set of descriptors for each of one or more regions (e.g., all regions), and use the region descriptors from one or more of the regions (e.g., the largest region(s) or the region(s) that are determined to be most distinguishable from other region(s) for which descriptors have been computed) to describe the visual images (e.g., using a feature vector). To reduce processing time, the comparison between visual images is typically done by comparing the feature vectors of the most prominent regions (determined in any of a variety of ways, e.g., by size or shape) in each visual image. Some of the features may be related to absolute or relative position in the visual image, allowing image geometry to play a role in aiding image similarity computations.

A last method is one described in "Object Class Recognition by Unsupervised Scale-Invariant Learning," by R. Fergus, P. Perona and A. Zisserman, In Proc. CVPR '03, 2003, the disclosure of which is hereby incorporated by reference herein. This method learns scale-invariant features from a set of visual images including a particular object or objects that are provided as a training set, and in an unsupervised way it is often able to pick out features specific to the object(s) common to all visual images in the training set. In this way, visual images can be classified according to the objects they contain. This method attempts to match visual images in an unsupervised manner according to the objects they contain; however, the method requires the definition of object classes and a training pass. In contrast, in some aspects of the present invention the retrieval of similar visual images containing similar objects is effected using no training and a single input visual image.

SUMMARY OF THE INVENTION

The invention is concerned with evaluating the content of visual images and, in particular, with determining similarity between visual images. For example, the invention can be implemented to make use of process-response statistical modeling of visual images in determining similarity between visual images. The invention is also concerned with making use of visual image content evaluation—and, in particular, image similarity (which can be determined, for example, using process-response statistical modeling of visual images)—to effect a variety of interactions with visual images, such as, for example, indexing of a collection of visual images, grouping of visual images of a collection of visual images, summarization of a collection of visual images, annotation of groups of visual images, searching for visual images (and, in particular, searching for visual images via a network), and identification of a representative visual image (keyframe) from a group visual images.

According to one aspect of the invention, a determination of similarity between visual images can be based on a process that measures the error of a visual image with itself after a transformation. In one embodiment of this aspect of the invention, image similarity is determined by: i) performing a process on the image data of each of a multiplicity of regions of a first visual image, the process measuring the error of a region of a visual image with itself after a transformation of the visual image including the region; ii) performing the process on the image data of each of a multiplicity of regions of a second visual image, where each region of the multiplicity of regions of the second visual image corresponds to a region of the multiplicity of regions of the first visual image; iii) comparing the measured errors of the multiplicity of regions of the first visual image to the measured errors of the corresponding regions of the second visual image; and iv) specifying the degree of similarity between the first and second visual images based on the comparison of the measured errors of the regions of the first and second visual images. The error measurement can be a measurement of perceptual error. The image transformation can be an affine transformation. The image transformation can be, for example, flipping (horizontal, vertical and/or diagonal) and/or rotation of the visual image. The image data of regions of the first and second visual images can be presented in a color space that includes an intensity component, such as a Y component, a V component, or an L component of the color space. The determination of similarity between visual images can further be based on a second process, different from the first process, performed on the image data of the regions of the first and second visual images.

According to another aspect of the invention, the determination of similarity between visual images can be based on a process that makes use of a perceptually uniform color space. In one embodiment of this aspect of the invention, image similarity is determined by: i) performing a process on the image data of each of a multiplicity of regions of a first visual image, the image data of regions of the first visual image being presented in a perceptually uniform color space; ii) performing a process on the image data of each of a multiplicity of regions of a second visual image, where each region of the multiplicity of regions of the second visual image corresponds to a region of the multiplicity of regions of the first visual image and the image data of regions of the second visual image is also presented in a perceptually uniform color space; iii) comparing the results of the process performed on the image data of regions of the first visual image to the results of the process performed on the image data of corresponding regions of the second visual image; and iv) specifying the degree of similarity between the first and second visual images based on the comparison of the results of the process performed on corresponding regions of the first and second visual images. The perceptually uniform color space can be, for example, a Munsell color space or an L*a*b* color space. The determination of similarity can be based on a process that measures the error of a visual image with itself after a transformation (as in the aspect of the invention described above). The image transformation can be an affine transformation. The determination of similarity between visual images can further be based on a second process, different from the first process, performed on the image data of the regions of the first and second visual images.

According to yet another aspect of the invention, the determination of similarity between visual images can be accomplished using process bootstrapping. In one embodiment of this aspect of the invention, image similarity is determined by: i) performing a first process on the image data of each of a multiplicity of regions of a first visual image; ii) performing a second process, for each of the multiplicity of regions of the first visual image, using the result of the first process for the region; iii) performing the first process on the image data of each of a multiplicity of regions of a second visual image, where each region of the multiplicity of regions of the second visual image corresponds to a region of the multiplicity of regions of the first visual image; iv) performing the second process, for each of the multiplicity of regions of the second visual image, using the result of the first process for the region; v) comparing the results of the first and second processes, or the second process, for the first visual image to, respectively, the results of the first and second processes, or the second process, for the second visual image; and vi) specifying the degree of similarity between the first and second visual images based on the comparison of the results of the process or processes for the first and second visual images. The second process can include calculating, for each region, the average difference between the result of the first process for that region and the result of the first process for each of a multiplicity of proximate regions. The first process can include measuring the error of a visual image with itself after a transformation (as in the aspects of the invention described above). The image transformation can be an affine transformation. The image data of regions of the first and second visual images can be presented in a perceptually uniform color space (as in the aspects of the invention described above).

According to still another aspect of the invention, the invention can be implemented to index or group the visual images of a collection of visual images based on an evaluation of the content of the visual images of the collection: this can be done, for example, by using determinations of the similarity of pairs of visual images of the collection. In one embodiment of this aspect of the invention, implemented (in whole or in part in alternative particular embodiments) on apparatus having a primary purpose of recording and/or playing back visual images, a collection of visual images including still visual images can be indexed by: i) evaluating the content of visual images in the collection of visual images; and ii) specifying the location of visual images within the collection of visual images based on the evaluation of the content of visual images in the collection. The indexed images can further be grouped based on the evaluation of the content of visual images in the collection. The indexing (and grouping) can be accomplished using image similarity determinations between pairs of visual images, which can be accomplished, for example, using process-response statistical modeling of the visual images. The apparatus on which this embodiment of the invention can be implemented can include a DVD recorder or player, a personal video recorder, a visual recording camera (digital or analog), a still visual image camera (digital or analog), a personal media recorder or player, and a mini-lab or kiosk. In another embodiment of this aspect of the invention, a collection of visual images including still visual image(s) and visual image(s) from a visual recording can be indexed by: i) evaluating the content of visual images in the collection of visual images; and ii) specifying the location of visual images within the collection of visual images based on the evaluation of the content of visual images in the collection. The indexed images can further be grouped based on the evaluation of the content of visual images in the collection. The indexing (and grouping) can be accomplished using image similarity determinations between pairs of visual images, which can be accomplished, for example, using process-response statistical modeling of the visual images. In yet another embodiment of this aspect of the invention, a collection of visual images including still visual images can be grouped by: i) evaluating the content of visual images in the collection of visual images; and ii) assigning a visual image of the collection of visual images to a group based on the evaluation of the content of visual images in the collection. The grouping can be accomplished using image similarity determinations between pairs of visual images, which can be accomplished, for example, using process-response statistical modeling of the visual images. The number of groups can be established explicitly, as can the maximum number of visual images allowed in a group and a minimum degree of similarity between and/or among visual images in a group). The number of groups, the number of visual images in each group and/or the degree of similarity between visual images in a group can also result from one or more other constraints (e.g., a minimum number groups, a minimum number of visual images in each group, a minimum degree of similarity between visual images in a group) additionally or alternatively placed on the population of groups with visual images.

According to still another aspect of the invention, determinations of the similarity between visual images of a collection of visual images can be used to summarize the collection of visual images. In particular, this aspect of the invention can be used to summarize a visual recording. In one embodiment of this aspect of the invention, a collection of visual images can be summarized by: i) determining the similarity of each of multiple visual images (e.g., all or substantially all) of the collection of visual images to one or more other visual images of the collection of visual images; ii) assigning each of the multiple visual images to one of multiple groups of visual images based on the similarity of the visual image to one or more other visual images of the collection of visual images; and iii) evaluating each of the multiple groups of visual images to identify one or more of the groups to include in the summary. Inclusion or exclusion of a group of visual images in the summary can be based on an evaluation of the similarity of the group of visual images to a "master" image. For example, a representative visual image or visual images (e.g., visual image(s) having at least a specified degree of similarity to the other visual images of the group, a specified number of visual images that are determined to be the most similar to the other visual images of the group) can be selected for a group and compared to the master image. The summary can be constructed by including in the summary each group having a specified degree of similarity to the master image or a specified number of groups which are determined to be the most similar to the master image. The summary can also be constructed by excluding from the summary each group having less than a specified degree of similarity to the master image or a specified number of groups which are determined to be the least similar to the master image. The summary can also be constructed by excluding from the summary each group having a specified degree of similarity to the master image or a specified number of groups which are determined to be the most similar to the master image. The summary can also be constructed by including in the summary each group having less than a specified degree of similarity to the master image or a specified number of groups which are determined to be the least similar to the master image. In another embodiment of this aspect of the invention, implemented (in whole or in part in alternative particular embodiments) on apparatus having a primary purpose of recording and/or playing back visual images, a collection of visual images can be summarized by: i) determining the similarity of each of multiple visual images of the collection of visual images to one or more other visual images of the collection of visual images; and ii) identifying visual images of the collection of visual images to be included in a summary of the collection of visual images based on the similarity of each of multiple visual images to one or more other visual images of the collection of visual images. For example, visual images can be assigned to groups based on the similarity of a visual image to one or more other visual images of the collection of visual images. Each group of visual images can then be evaluated to identify one or more groups to include in the summary (e.g., in the manner described above). Apparatus on which this embodiment of the invention can be implemented includes, for example, a DVD recorder or player, a personal video recorder, a visual recording camera, a still visual image camera, a personal media recorder or player, and/or a mini-lab or kiosk.

According to still another aspect of the invention, determinations of the similarity of image representations for groups of visual images in a collection of visual images (e.g., scenes in a visual recording) can be used to annotate those groups of visual images. In one embodiment of this aspect of the invention, groups of visual images in a collection of visual images can be annotated by: i) identifying an image representation for each of the groups of visual images; ii) determining the similarity of each of the image representations to one or more other image representations for other group(s) of visual images; and iii) annotating the groups of visual images based on the similarity of each image representation to the other image representation(s). An image representation of a group of visual images can be a representative visual image (keyframe) selected from the group of visual images. A process-response statistical model of the representative visual image can be produced for use in determining the similarity of the image representation to other image representations. An image representation of a group of visual images can be an average of one or more image characteristics for visual images of the group of visual images: in particular, an average process-response statistical model for visual images of a group can be determined for use in determining similarity to other image representations. The annotation of groups of visual images can be, for example, assignment of each group of visual images (e.g., scene) to one of multiple groups (e.g., DVD chapters) of groups of visual images, based on the similarity determinations for the image representations for the groups of visual images. This aspect of the invention can be implemented (in whole or in part in alternative particular embodiments) on apparatus having a primary purpose of recording and/or playing back visual images, such as a DVD recorder or player, a personal video recorder, a visual recording camera, a still visual image camera, a personal media recorder or player, and/or a mini-lab or kiosk.

According to still another aspect of the invention, determinations of visual image similarity can be used in effecting searching via a network of computational apparatus for visual image(s) located at node(s) of the network other than the node at which the search is instigated (e.g., searching for visual image(s) located at remote node(s) on the Internet and, in particular, the World Wide Web part of the Internet). In one embodiment of this aspect of the invention, searching for a visual image is implemented by: i) receiving, at a first node of a network of computational apparatus, data regarding a search visual image, the data having been sent from a second node of the network or in response to a communication from the second node identifying the search visual image; and ii) identifying, at the first node of the network, one or more matching visual images that have a specified degree of similarity to the search visual image, the identification being accomplished by determining the similarity, using a method that is not domain-specific (i.e., that does not depend on the type of visual images being compared), of the search visual image to each of multiple candidate visual images located at one or more nodes of the network other than the first or second node, and selecting one or more candidate visual images as the one or more matching visual images, based on the determination of the similarity of the search visual image to the candidate visual images. The data regarding a search visual image can be image search data regarding the search visual image (which can be sent from the second node of the network, or, in response to a communication from the second node identifying the image search data, from a node of the network other than the first or second node). Or, the data regarding a search visual image can be data identifying image search data regarding the search visual image (the image search data can be located at the first node at the time that the identification of the image search data is received, or at another node of the network other than the first or second node and retrieved in response to identification of the image search data). Image generation data representing a matching visual image can be provided to the second node of the network, i.e., the node from which the image search request was generated. The image search data can be image generation data representing the search visual image, either the original version of the search visual image or a reduced-resolution version of the search visual image, from which metadata regarding the search visual image can be produced at the first node and compared to metadata regarding each of the candidate visual images to make the similarity determinations. Or, the image search data can be metadata regarding the search visual image which can be used directly in making the similarity determinations. In general, the matching visual image(s) are selected as the one or more candidate visual images that are determined to be the most similar to the search visual image. The matching visual image(s) can be the candidate visual image(s) having at least a specified degree of similarity to the search visual image. Or, the matching visual image(s) can be a specified number of candidate visual image(s) that are determined to be the most similar to the search visual image. Candidate visual images can include still visual image(s) and/or visual image(s) from one or more visual recordings. Image generation data for the candidate visual images can be received at the first node and used to produce metadata regarding the candidate visual images, which can be stored at the first node. Image generation data for a candidate visual image can be stored at the first node for possible provision to the second node if the candidate visual image is determined to be a matching visual image. Or, the image generation data for a candidate visual image can be discarded and, if the candidate visual image is determined to be a matching visual image, an identification of a network node at which image generation data representing the candidate visual image is located can be provided to the second node. Candidate visual images can be identified by communicating with various nodes of the network to identify whether one or more visual images are present at those network nodes that can be used as one or more candidate visual images. In another embodiment of this aspect of the invention, searching for a visual image is implemented by: i) evaluating a search visual image to produce metadata regarding the search visual image that can be used to identify, in a manner that is not domain-specific (i.e., that does not depend on the type of visual images being compared), one or more matching visual images that are determined to have a specified degree of similarity to the search visual image; and ii) enabling provision of the metadata from a first node of a network of computational apparatus to a second node of the network for use at a node other than the first node of the network in identifying one or more matching visual images. Image generation data representing a matching visual image can be received at the first node. This embodiment of this aspect of the invention can be implemented, for example, as part of Web browsing software that operates at the first node (e.g., as one or more Java applets or ActiveX controls that operate as part of Web browsing software) or as standalone software (i.e., software that does not operate as part of software, e.g., Web browsing software, used to communicate via the network) that operates at the first node. In any embodiment of this aspect of the invention, metadata regarding a visual image can be produced by producing a process-response statistical model of the visual image. A process-response statistical model of a visual image can be produced by performing a process on the image data of each of multiple regions of the visual image that measures the error of a region with itself after a transformation of the visual image. The image data can be presented in a perceptually uniform color space. Further, the process-response statistical model of a visual image can be produced by performing a first process on the image data of regions of the visual image, then performing a second process for each of the regions using the result of the first process for the region.

According to still another aspect of the invention, determinations of the similarity of pairs of visual images of a group of visual images (e.g., a scene in a visual recording, a collection of still photographs) can be used to select a visual image (keyframe) from the group that is representative of the group. In one embodiment of this aspect of the invention, from a group of visual images that includes multiple still visual images, a visual image can be selected from the group of visual images to represent the group of visual images, by: i) determining the similarity of each of the visual images of the group to other visual images of the group; and ii) selecting a visual image from the group to represent the group, based on the similarity of each visual image of the group to the other visual images of the group (e.g., choosing the visual image that is most similar to the other visual images of the group). In another embodiment of this aspect of the invention, implemented (in whole or in part in alternative particular embodiments) on apparatus having a primary purpose of recording and/or playing back visual images, a visual image can be selected from a group of visual images to represent the group of visual images, by: i) determining the similarity of each of the visual images of the group to other visual images of the group; and ii) selecting a visual image from the group to represent the group, based on the similarity of each visual image of the group to the other visual images of the group. This aspect of the invention can be implemented, for example, by producing multiple similarity measures for each visual image, each similarity measure representing the similarity of the visual image to another visual image of the group, then combining the similarity measures for each visual image and choosing a visual image to represent the group based on the combined similarity measures for the visual images of the group. This aspect of the invention can also be implemented, for example, by determining the quality of each of the visual images and selecting the representative visual image based on the quality of the visual images of the group, in addition to the similarity of each visual image of the group to other visual images of the group, e.g., choosing the visual image having most similarity to the other visual images of the group that also satisfies one or more image quality criteria, or choosing the visual image having the best combined similarity determination and quality determination. This aspect of the invention can also be implemented, for example, by determining the location in the group of each of the visual images and selecting the representative visual image based on the location of the visual images of the group (e.g., based on the proximity of each visual image of the group to the beginning of the group), in addition to the similarity of each visual image of the group to other visual images of the group.

Any aspect of the invention can be implemented as a method in accordance with the description herein of that aspect of the invention, a system or apparatus for performing such a method, and/or a computer program including instructions and/or data for performing such a method. The invention can be implemented using any type of system or apparatus having appropriate computational capability to effect the functions of the invention (a computer program, then, is any set of instructions and/or data that can be used by computational apparatus to effect operation of a method or part of a method).

In any of the embodiments of the invention, the collection of visual images can be stored on a digital data storage medium or media, such as one or more DVDs or one or more CDs. Further, any set of visual image(s) produced by interacting with (e.g., searching, indexing, grouping, summarizing, annotating, keyframing) the collection of visual images, and/or metadata regarding visual image(s) or interaction with the collection of visual images, can be stored on such data storage medium, in addition to, or instead of, the collection of visual images.

Above, some embodiments of the invention are specifically described as being implemented, in whole or in part, on apparatus having a primary purpose of recording and/or playing back a visual recording and/or still visual images, such as, for example, a DVD recorder or player, a personal video recorder, a visual recording camera, a still visual image camera, a personal media recorder or player, and/or a mini-lab or kiosk. More generally, any embodiment of the invention can be implemented on such apparatus. Further, any embodiment of the invention can also be implemented, in whole or in part, on apparatus which does not have a primary purpose of recording and/or playing back a visual recording and/or still visual images, such as, for example, a general purpose computer, a cell phone, or a personal digital assistant.

BRIEF DESCRIPTION OF THE DRAWINGS

FIG. 5 illustrates normalized binned process results for two histograms and the differences for each bin, which can be used in computing image similarity.

DETAILED DESCRIPTION OF THE INVENTION

I. Motivation

Figure 1:
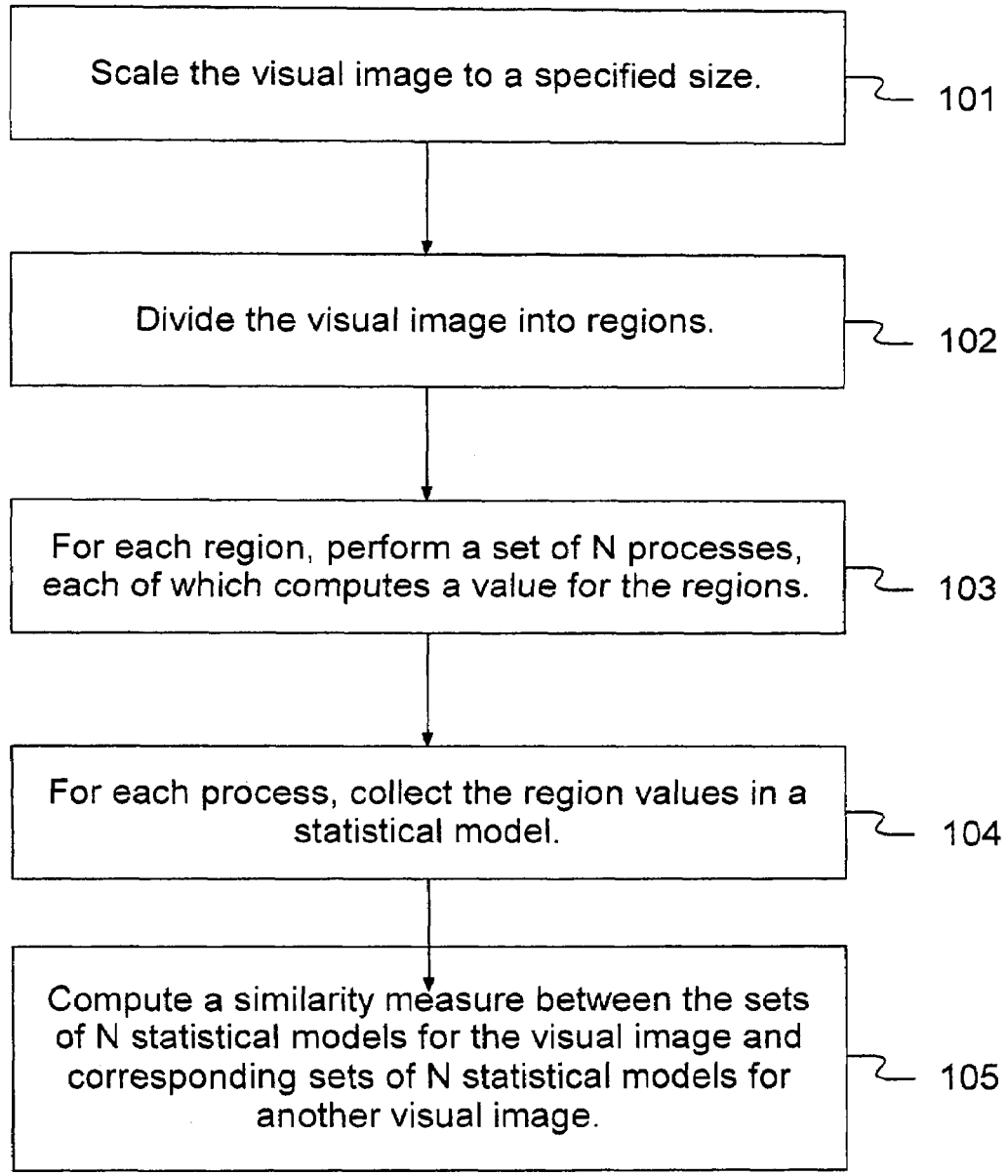
FIG. 1 is a flow chart of a method, according to an embodiment of the invention, for determining the similarity of two visual images using process-response statistical modeling of the visual images.

Many applications, especially in the field of computer vision, require the ability to measure the similarity between two visual images. It may be desired, for instance, to determine whether two visual images are the same (e.g., have greater than a specified degree of similarity) or to rank visual images against a prototype visual image from most similar to least similar.

For example, it may be necessary or desirable for a video analysis computer program to be able to divide a video into logical pieces. To determine when camera cuts (which can be chosen to define a division between pieces of the video) occur in the video, two adjacent video frames can be compared to see if their dissimilarity is relatively large or not. If the two video frames are found to be sufficiently dissimilar, then a camera cut is detected and the video is divided into pieces between the adjacent video frames. Comparison of adjacent video frames for this purpose has usually been accomplished using a simple measure of similarity, such as the average pixel error between the adjacent video frames or the average error between the two video frames' color distributions. However, the problem becomes much more difficult if the video is to be divided into pieces such that each piece of the video includes visual images that are semantically similar. In that case, the image similarity measure has to be able to infer semantics from the visual images, and be able to numerically quantify and compare the semantic content of the visual images. In many cases, simple comparisons between color distributions or pixel values do not succeed in capturing this level of inference and therefore do not produce good results in such situations.

Another application for image similarity is unsupervised content-based image retrieval (CBIR). Given a visual image as input, the goal is to retrieve the most similar visual image from a database of visual images. For example, it may be desired to find more visual images of X, given a visual image of X, where X is some arbitrary object or scene, e.g., if a visual image of a dinosaur is given, it is desired that more visual images of dinosaurs be retrieved. In such cases, it is often not satisfactory to simply find the visual image with the minimum per-pixel error, or the visual image with the most similar color distribution, as has been done in the past. These similarity measures often return results that may be similar in a mathematical sense, but have no semantic relationship with the input visual image.

It can also be desirable to logically group a set of photos. For example, it may be desirable to take a large collection of visual images representing a variety of content and place the visual images into groups corresponding to logical categories to facilitate browsing among the visual images. Image similarity can be used for this purpose. Using image similarity to organize a large collection of visual images could also be useful for speeding up CBIR searches among visual images of the collection, and for making photo software easier for consumers to use by facilitating interaction with a large collection of visual images using the software.

Higher-level image similarity methods include face recognition. Given a visual image including a frontal view of a face that has not yet been identified as that of a known person, and a database of visual images including faces of known persons, the goal is to discover the identity of the person in the given visual image by performing comparisons of that visual image to the visual images in the database. Often, very specialized methods that are particularly tailored (domain-specific methods) for analyzing and comparing visual images to evaluate whether the visual images include one or more faces that are deemed to be the same are employed for this purpose. However, it is possible that a general visual image comparison method that attempts to take advantage of image semantics at some level may also be successful in face recognition to an acceptable degree. Since face recognition methods are generally not good at other more general image similarity problems, a non-domain-specific image similarly method that can adequately recognize faces would advantageously provide a single flexible image similarity method that can be used to tackle a variety of image similarity problems, including face recognition. At the very least, such a general, non-domain-specific method could be employed to reduce the number of visual images in the database that may possibly include a face that matches a face in the visual image being evaluated.

The success rate in appropriately identifying visual images for each of the above applications is highly dependent on the quality of the image similarity method used. Innovations in image similarity methods can be of great importance in producing high quality results for many computer vision applications.

II. Overview of Invention

The invention is concerned with evaluating the content of visual images and, in particular, with determining similarity between visual images. For example, the invention can be implemented to make use of process-response statistical modeling of visual images in determining similarity between visual images, a new approach to image similarity determination that, as explained further below, provides numerous advantageous characteristics. The invention is also concerned with making use of visual image content evaluation—and, in particular, image similarity (which can be determined, for example, using process-response statistical modeling of visual images)—to effect a variety of interactions with visual images, such as, for example, indexing of a collection of visual images, grouping of visual images of a collection of visual images, summarization of a collection of visual images, annotation of groups of visual images, searching for visual images (and, in particular, searching for visual images via a network), and identification of a representative visual image (keyframe) from a group visual images. The invention can be implemented as a method in accordance with the description of the invention herein, a system or apparatus for performing such a method, and/or a computer program including instructions and/or data for performing such a method. The invention can be implemented using any type of apparatus having appropriate computational capability to effect the functions of the invention.

As indicated above, the invention can be implemented to make use of process-response statistical modeling of a visual image in determining similarity between visual images. According to one aspect of the invention, the determination of similarity between visual images can be based on one or more processes that measure the error of a visual image with itself after a transformation. The transformation can be an affine transformation. The transformation can include, for example, flipping (horizontal, vertical and/or diagonal) and/or rotation of the visual image. According to another aspect of the invention, the determination of similarity between visual images can be based on one or more processes that make use of a perceptually uniform color space, such as a Munsell or L*a*b* color space. According to yet another aspect of the invention, the determination of similarity between visual images can be accomplished using process bootstrapping.

Additionally, as indicated above, the invention can be implemented to make use of image similarity in effecting a variety of interactions with a collection of visual images. The similarity determination can, in each case, be made using the process-response statistical modeling approach described above and in detail below. According to one aspect of the invention, as also indicated above, the invention can be implemented to index the visual images of a collection of visual images that includes still visual images (and can also include visual images from a visual recording) based on an evaluation of the content of the visual images of the collection: this can be done, for example, by using determinations of the similarity of pairs of visual images of the collection. According to another aspect of the invention, determinations of the similarity of pairs of visual images of a visual recording can be used to summarize the visual recording. According to yet another aspect of the invention, determinations of the similarity of image representations for groups of visual images in a collection of visual images (e.g., scenes in a visual recording) can be used to annotate those groups of visual images. According to still another aspect of the invention, determinations of visual image similarity can be used in effecting searching via a network of computational apparatus for visual image(s) located at node(s) of the network other than the node at which the search is instigated (e.g., searching for visual image(s) located at remote node(s) on the Internet and, in particular, the World Wide Web part of the Internet). According to another aspect of the invention, determinations of the similarity of pairs of visual images of a group of visual images (e.g., a scene in a visual recording, a collection of still photographs) can be used to select a visual image from the group that is representative of the group.

A collection of visual images can include visual images from a visual recording, still visual images, or both. Herein, a "visual recording" includes one or more series of visual images, each series of visual images typically acquired at a regular interval by a visual image data acquisition apparatus such as a video camera (for convenience, "video camera" and "visual recording apparatus" are sometimes used herein to refer to all visual image data acquisition apparatus adapted to acquire a visual recording) and representing visual content that occurs over a period of time. A visual recording may or may not also include audio content (e.g., audio content recorded together with the visual content, a musical soundtrack added to visual content at the time of, or after, recording of the visual content). A visual recording can be, for example, a digital visual recording acquired by a digital video camera (or a digitized analog visual recording acquired by an analog video camera). In contrast to the visual images of a visual recording, a "still visual image" is a single visual image that is intended to be able to stand alone, without regard to context provided by any other visual image. A still visual image can be, for example, a digital photograph (or a digitized analog photograph), a Powerpoint slide and/or an animated drawing. A set of still visual images may or may not also be accompanied by audio content (e.g., a musical soundtrack).

As suggested above, in general, the collection of visual images can be in analog and/or digital form. However, visual images of the collection that are in analog form must be converted to digital form to enable processing of the visual images in accordance with invention. Further, in general, the collection of visual images can be stored on any data storage medium or media that enables storage of visual images, including analog and/or digital data storage media. However, even when all of a collection of visual images is initially stored on analog data storage medi(a), the visual images must at some point be stored on digital data storage medi(a) since the visual images must be converted to digital form to enable processing of the visual images in accordance with invention. The collection of visual images can be stored on, for example, DVD(s), CD(s), and/or optical data storage medi(a).

The invention can be implemented, in whole or in part, by one or more computer programs (i.e., any set of instructions and/or data that can be used by computational apparatus to effect operation of a method or part of a method) and/or data structures, or as part of one or more computer programs and/or data structure(s), including instruction(s) and/or data for accomplishing the functions of the invention. (For convenience, "computer code" is sometimes used herein to refer to instruction(s) and/or data that are part of one or more computer programs.) The one or more computer programs and/or data structures can be implemented using software and/or firmware that is stored and operates on, and effects use of, appropriate hardware (e.g., processor, volatile data storage apparatus such as a memory, non-volatile data storage apparatus such as a hard disk). Those skilled in the art can readily implement the invention using one or more computer program(s) and/or data structure(s) in view of the description herein. Further, those skilled in the art can readily appreciate how to implement such computer program(s) and/or data structure(s) to enable execution and/or storage on any of a variety of computational apparatus and/or data storage apparatus, and/or using any of a variety of computational platforms.

As indicated above, the invention can be implemented using any type of apparatus (which can include one or more devices) having appropriate computational capability (i.e., including appropriate computational apparatus) to effect the functions of the invention. As can be appreciated from the description herein, the invention can readily be implemented, in whole or in part, using apparatus adapted to obtain and/or play back digital visual recordings and/or still visual images; however, the invention can also be implemented, in whole or in part, using apparatus adapted to obtain and/or play back analog visual recordings and/or still visual images if the apparatus has—or can make use of other apparatus which has—the capability of converting the analog visual recording and/or images to digital form to enable processing of the recording and/or images in accordance with invention. Additionally, apparatus used to embody the invention can be implemented to enable communication via a network when aspect(s) of the invention may or must make use of communication over a network.

In particular, the invention can be implemented, in whole or in part, on (i.e., as part of, or together with) apparatus which has a primary purpose of recording and/or playing back a visual recording and/or still visual images, such as, for example, a digital video disk (DVD) recorder or player; a personal video recorder (PVR), such as a Tivo™ or Replay™ recording apparatus; a visual recording camera (as used herein, any apparatus for acquiring a visual recording), including a camcorder; a still visual image camera; a personal media recorder or player, such as, for example, the Zen Portable Media Center produced by Creative Labs, Inc. of Milpitas, Calif., or the Pocket Video Recorder made by Archos, Inc. of Irvine, Calif.; or a mini-lab or kiosk that is adapted for processing (e.g., printing, image enhancement, cropping, rotating, zooming, etc) of a collection of visual images, as produced by a variety of companies such as Fuji (e.g., the Aladdin Picture Center), Kodak (e.g., Picture Maker) and Pixel Magic Imaging (e.g., Photo Ditto). As one illustration, the invention can be implemented, in whole or in part, as part of a home theater system, which can include a television, digital video playback and/or recording apparatus (such as, for example, a DVD player, a DVD recorder or a digital PVR) enhanced with software that implements functions of the invention as described in detail elsewhere herein, and a DVD burner (or other apparatus for storing data on a digital data storage medium, such as a CD burner) which can be used for storing visual images and/or data representing visual images.

The invention can also be implemented, in whole or in part, on apparatus which does not have a primary purpose of recording and/or playing back a visual recording and/or still visual images. For example, the invention can be implemented, in whole or in part, on one or more general purpose computers, including general purpose computers conventionally referred to as personal computers, server computers, desktop computers and mainframe computers. The invention can also be implemented, in whole or in part, on, for example, a cell phone or a personal digital assistant (PDA).

As can be seen from the above, the invention can be implemented on apparatus that is portable (i.e., that are intended to, and can, be carried around easily)—and, further, apparatus that is handheld—or that are not portable. Personal computers, server computers, desktop computers and mainframe computers are examples of non-portable apparatus on which the invention can be implemented. DVD recorders, DVD players and PVRs are examples of apparatus on which the invention can be implemented that may be characterized as portable or non-portable: the characterization as portable or non-portable may depend on the nature of the particular implementation (e.g., the size, the presence of carrying features). Camcorders, still visual image cameras, personal media recorders and players, laptop computers, cell phones and PDAs are examples of apparatus on which the invention can be implemented that are generally characterized as portable.

A process-response statistical model is a particular form of image metadata that can be used in evaluating the similarity of two visual images. As described in more detail below, aspects of the invention can make use of other image similarity determination methods and, in particular, image similarity determination methods that make use of metadata regarding visual images to evaluate the similarity of those visual images. In general, image metadata can be produced at any time. For example, image metadata can be produced as a visual image is acquired by visual image data acquisition apparatus (e.g., a visual recording camera, a still visual image camera;). Or, image metadata can be produced at some time after a visual image has been acquired.

III. Overview of Process-Response Statistical Modeling of a Visual Image for Use in Image Similarity Determination In accordance with an aspect of the invention, a process-response statistical model is produced for each of multiple visual images and used as a basis of comparison of the visual images to determine the degree of similarity of the visual images. In a particular embodiment of this aspect of the invention, the process-response statistical model for a visual image is produced as a process-response histogram. In the discussion of the invention below, embodiment of the invention using process-response histograms is sometimes described to illustrate various aspects of the invention. However, those skilled in the art can appreciate that other types of process-response statistical models can be used to implement the invention. For example, the process-response statistical model can be represented by, instead of histograms, a Gaussian mixture model or a joint probability distribution. Those skilled in the art can construct and use such other process-response statistical models to implement the invention in view of the discussion herein of the principles of the invention.

To construct a process-response statistical model (e.g., process-response histogram), a visual image can be divided into regions (e.g., spatially divided into regions such as square blocks) and a series of computational processes applied to each region. In one implementation of the invention, a set of histograms is produced for each visual image, where each histogram represents the probability of receiving a particular response in a region of the visual image from one of the computational processes. The number of histograms in the set of histograms for a visual image is equal to the number of computational processes that are used. When the invention is implemented as one or more computer programs, each set of histograms can be represented by an array of values for use by the computer program(s). Each location in the array typically represents a range of possible values for a computational process, so that the value that the invention typically computes at that location is the probability of that process producing a value within that range for a region of the visual image.

FIG. 1 is a flow chart of a method, according to an embodiment of the invention, for determining the similarity of two visual images using process-response statistical modeling of the visual images. In step 101, a visual image is scaled to a specified size. (As explained elsewhere herein, while this step is desirable, it is not necessary.) In step 102, the visual image is divided into regions (e.g., square blocks of pixels). In step 103, for each region, a set of N processes are performed, each of which computes a value for the region. In step 104, for each process, the region values are collected in a statistical model (e.g., a histogram) which describes the likelihood of obtaining a particular value for that process for a region of the visual image. In step 105, the visual image is compared to another visual image by computing a measure of similarity between the sets of N statistical models (e.g., histograms) for the visual images. Detailed descriptions of how each of these steps can be implemented are given below.

The invention can be used to determine the similarity between two visual images and the description herein of particular embodiments and aspects of the invention is generally made with respect to the use of the invention in that way. However, the invention can also be used to enable determination of the similarity between two visual recordings or between a visual recording and a visual image. Such similarity determination can be useful, for example, in content-based image retrieval and, in particular, searching for visual images and/or visual recordings, such as searching for visual images and/or visual recordings via a network of computational apparatus (e.g., via the World Wide Web), aspects of the invention that are discussed in more detail below. This can be done, for example, by computing the average for all visual images of a visual recording of an image characteristic or characteristics used in making the similarity determination, and comparing that average to the average for another visual recording (when determining the similarity between two visual recordings) or to the image characteristic(s) for a visual image (when determining the similarity between a visual recording and a visual image). Or, this can be done, for example, by computing the average for selected visual images of a visual recording (e.g., keyframes for scenes of a visual recording) of image characteristic(s), and comparing that average to the average for another visual recording (which can be the average for all visual images of that visual recording or for selected visual images such as keyframes) or to the image characteristic(s) for a visual image. Or, for example, this can be done by determining the similarity of each visual image or each selected visual image (e.g., keyframes) of a visual recording to each visual image or each selected visual image (e.g., keyframes) of another visual recording, or to another visual image, then combining the similarity determinations (e.g., averaging similarity scores) to produce an overall determination of similarity between the visual recording and the other visual recording or a visual image.

In other histogramming methods, the histogram is generated by collecting per-pixel statistics, such as a color value per pixel or an edge orientation value per pixel. Such methods are therefore limited to representing only pixel-level statistics. (The color correlogram is an interesting case since it describes the behavior of a neighborhood about a pixel, but it still computes values on a per-pixel basis.) A process-response statistical modeling method in accordance with the invention is different in that it is not restricted to pixel-level statistics, but also allows region-level statistical computations (in particular, for regions defined to be larger than a single pixel). The use of region-level statistics can be better than the use of pixel-level statistics because each region contains more information than a pixel (when regions are defined to be larger than a pixel, as will typically be the case) and a richer amount of information regarding inter-relationships (e.g., a region can contain information about the relationship between two objects, whereas most pixels cannot do that effectively).

Some image similarity detection methods compute region-level statistics. However, unlike the region-level statistics computed by the process-response statistical modeling method according to the invention, those statistics are generally quite simple (for example, those statistics may restrict the analysis to only a couple features, such as average color or edge pixel count, whereas a process-response statistical modeling method according to the invention can make use of a larger variety of more sensitive statistical measures) and are not put into probability distributions. Further, those methods rely on direct comparisons between significant regions in visual images, rather than a general comparison of trends over many regions. The significance of regions may be inconsistently assigned from visual image to visual image, potentially causing the most significant regions from two similar visual images to be quite different. Also, the methods used to manage these direct comparisons often incorporate specific ideas about how regions should be related, based upon the intuition of the creator of the method. Although this intuition may be valid for a large class of visual images, there are always cases for which the intuition will not be valid. For these reasons, the direct comparison methods often exhibit a lack of robustness. A process-response statistical modeling method according to the invention aims to avoid incorporation of special knowledge and selection of a handful of important regions. Instead, probability distributions over a large number of regions are compared directly. Further, a process-response statistical modeling method according to the invention can provide the ability to subdivide a visual image into arbitrary regions; many other methods rely heavily on specific techniques for intelligent subdivision of a visual image.

A process-response statistical modeling method according to the invention is also unique and advantageous in its generality and flexibility. The process-response statistical modeling approach encompasses a general framework in which to compute image similarity: the general approach is not very constrained, other than that statistics about regions are collected into a model and the model is used as the basis of an image similarity comparison. A process-response statistical modeling method according to the invention does not depend on the type of the visual images being compared in determining the similarity between those visual images (i.e., the method is not domain-specific), unlike, for example, similarity determination methods commonly used for face recognition; the invention can readily be used in determining similarity between visual images of any type. Any processes can be used so long as the process conforms to a very small number of rules. (Examples of processes that can be used are discussed further below.) The regions can be arbitrary (e.g., regions can be of any size and/or shape, and can vary in size and/or shape in an visual image). Process-response statistical models can be produced in a variety of ways (for example, as indicated above, the process-response statistical models can be produced using histograms, a Gaussian mixture model or a joint probability distribution) and the similarity comparisons made in a variety of ways (e.g., for histograms, L1-norms, described below, and earth-mover's distance are two examples of how a similarity comparison can be made). A particular embodiment of the invention is described below in which rectangular regions are used, the process-response statistical model is a set of process-response histograms, and the similarity comparison is made using L1-norms. However, other particular combinations can be used.

IV. Details of Process-Response Statistical Modeling of a Visual Image for Use in Image Similarity Determination A. Scaling a Visual Image It is desirable to begin the process with all visual images scaled to relatively similar sizes without disturbing the aspect ratio. This allows comparisons to be made between visual images that are different sizes, while still using the same fixed-scale process. For example, visual images to be compared can be divided into 8×8 blocks for processing, and it helps if an 8×8 block occupies a proportionately similar area in each visual image. The aspect ratio doesn't need to be changed, but it helps if in the following steps, each visual image to be compared is divided into a similar number of regions. Similar visual images at very different resolutions will look similar but can have very different properties, which can cause very different process-response statistical modeling results and may lead to erroneous similarity determinations. Thus, it is desirable for the visual images to have the same (or nearly the same) resolution (size), to facilitate meaningful comparison of statistics. This is particularly so when the invention is implemented to compute features that are not scale invariant. Nevertheless, it is always possible to compare process-response statistical models from differently-sized visual images, and at times that may be desirable when attempting to match objects at different zoom factors.

B. Dividing a Visual Image into Regions

Process-response statistical modeling according to the invention is a very flexible approach to determining visual image similarity, and much creativity can be exercised in deciding how to divide visual images into regions. Below, several ways in which visual images can be divided into regions to compute statistics are described. The visual images can be divided spatially, of course, as they must be; this is a requirement of the process-response statistical modeling approach. Visual images may be divided in color space, in addition to being spatially subdivided, as will be described later. Visual images can also be divided in scale space (a one-dimensional space defined by a scaling parameter in which visual images can be represented at different scales) or any other affine space. These latter divisions (color space, scale or other affine space) may or may not require that multiple process-response statistical models be computed and considered separately in similarity computations.

Figure 2:
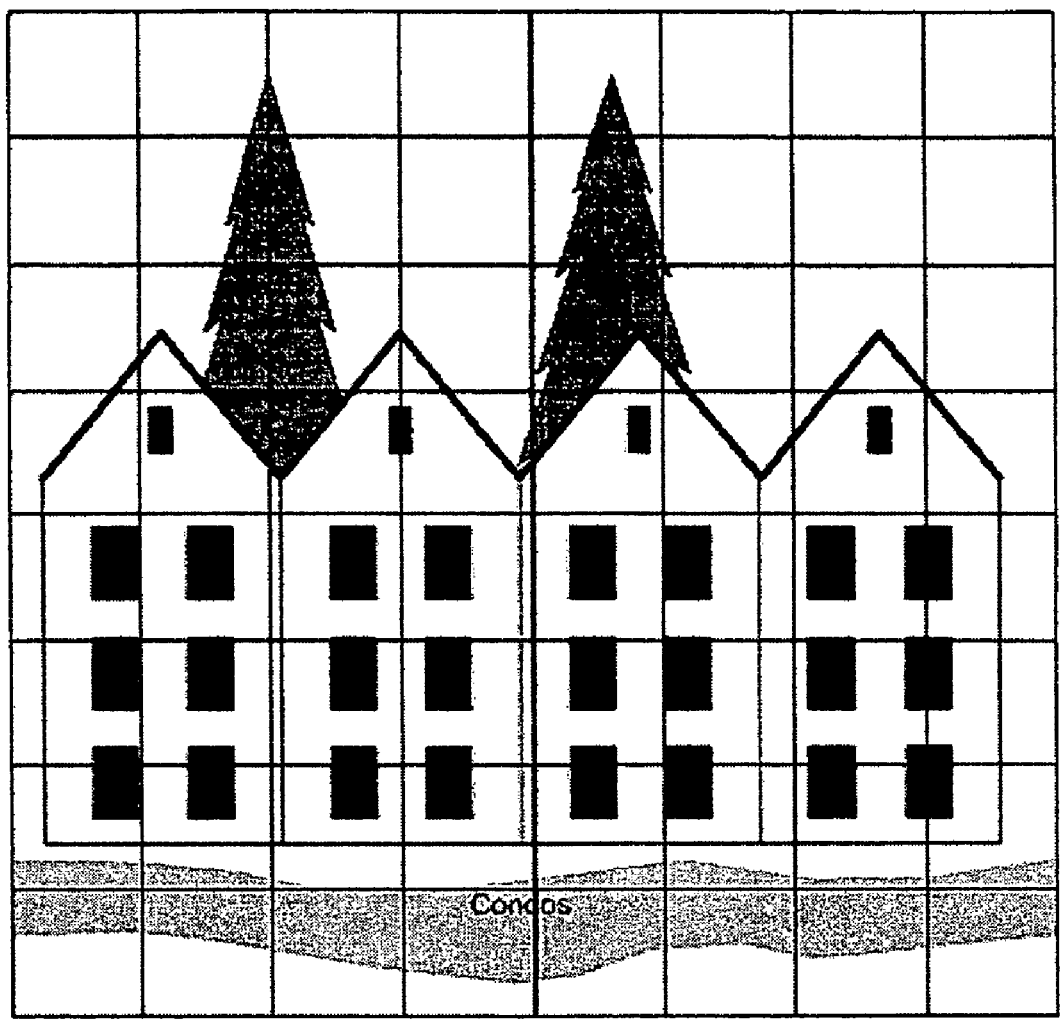
FIG. 2 illustrates a visual image divided into regions.

The simplest way of dividing a visual image is to subdivide it into blocks. For example, a process-response statistical modeling method according to the invention can be implemented so that a visual image is divided into blocks that are defined as M by M (e.g., 8×8) regions of pixels in the visual image. In such an implementation, blocks at boundaries of the visual image may be non-square; non-square blocks at image boundaries can be retained for use in the analysis or eliminated from consideration. FIG. 2 illustrates a visual image divided into square (M by M) regions. Dividing a visual image into square regions for use in a process-response statistical modeling method according to the invention can be advantageous because processes can be designed that take advantage of the uniform region dimensions, and using uniformly sized regions contributes to producing consistent statistics for each process.

In some implementations of the invention, the blocks can be allowed to overlap. This can result in improvements in the statistical measures of the process-response statistical model. For example, this can help in reducing any artifacts that occur due to coincidental alignment of image generation data with an arbitrary grid. The blocks can be allowed to overlap as much as desired, however each process must be performed on each block, so the increase in number of blocks that results from allowing overlap undesirably increase the amount of time required for computation of the process-response statistical model. For example, allowing blocks to overlap by half in each dimension leads to a factor of four penalty in computation time, so increasing overlap can become undesirable if computation time is an issue for the application.

In the process-response statistical modeling approach of the invention, there need be no restriction on the way visual images are spatially subdivided into regions, so long as the processes applied to those regions can be consistent across regions of potentially different shape. Additionally, it can be advantageous to generate statistics for coherent regions (i.e., regions having a particular property throughout the region) of a visual image, so that perceptually different aspects of visual images are not mixed when computing statistics.

A visual image can be manipulated in one or more ways to produce one or more different versions of the visual image. A process-response statistical model of a visual image can be produced based on multiple versions of a visual image. For example, a visual image can be filtered and/or scaled, as in a Laplacian pyramid or Wavelet transform. A process-response statistical model can be produced for each of the versions of the visual image, and the results can be combined into a single process-response statistical model using weighted averaging. The weighting can be done in any desired manner. In one implementation, each version of the visual image is given equal weight (i.e., 1/N, where the weights are normalized and there are N versions of the visual image). Alternatively, the versions can be kept separate, and, in that case, two visual images may be compared by finding the best match between any two of their process-response statistical models. The matching of process-response statistical models from visual images at different scales can be helpful in finding similarity between visual images containing same objects at different scales (e.g., visual images including the same objects viewed up close and far away). A process-response statistical model from the same visual image at multiple scales can also be compared on a per-scale basis (i.e., multiple comparisons between two visual images are made, each comparison at a different scale), which would lead to a comparison of two visual images using statistics from multiple resolutions. The image transformations are not limited to scaling, and any affine transformation (e.g., one or some combination of rotation, scaling, shearing, translation, etc.) of the visual images could beneficially be used, such as a 45 degree rotation or a shear.

As indicated above, a visual image can also be divided in color space. For example, average color can be computed for each spatial region (e.g., block) of a visual image, and the regions put into standard bins based on the computed average colors. Each bin of regions can be treated just like any other visual image: the set of processes can be performed on each region in the bin, and statistics on the results can be collected and kept separate for each group. Then, a separate process-response statistical model can be computed for all the regions in each bin. If we suppose that there are 8 bins for average color (one bit per channel for a three-channel color space, for example), then we can have one process-response statistical model for all regions with average color 0, another for regions with average color 1, and so on. This use of information about the regions can advantageously enable more separation between statistics to be maintained. Thus, regions that tend to be more similar are compared on a statistical basis independent of regions that may be quite different. However, producing process-response statistical models in this way can inhibit identification of similarity between objects that are differently colored but otherwise similar (e.g., have similar shape and other features).

C. Performing the Process(es)

The first task before running processes on the regions is to decide upon which processes to use. When a visual image is divided into blocks, the results of the following operations on the blocks can be computed:

Error of region with itself after horizontal, vertical or diagonal flip of the visual image
  Error of region with itself after a 90 degree rotation of the visual image
  The absolute sum of all coefficients from a Hadamard transform In particular, in one aspect of the invention, image similarity is determined based on one or more processes that measure error of a region with itself after a transformation of the visual image. The error can be perceptual error. The transformation can be, for example, an affine transformation. The transformation can be, for example, flipping (horizontal, vertical and/or diagonal) and/or rotation of the visual image (i.e., process(es) described by the first two bullets above). Such processes have been found to be particularly useful in making accurate image similarity determinations. Processes can also be defined that are not limited to symmetric shapes such as blocks, but which could also be used on blocks:

Variance of each color channel among the pixels within the region
  Covariance between each pair of color channels for the pixels within the region
  Average value of each color channel for the pixels of the region
  First-order horizontal and vertical correlation of the pixels of the region
  Sum of differences of adjacent pixels within the region, either horizontal or vertical
  Average edge orientation within the region
  Orientation of strongest edge within the region
  Count of edge pixels from a Canny edge detector within the region In general, the addition of more processes improves the results obtained. For example, in one embodiment of the invention, one or more additional processes can be used together with process(es) that measure error of a region with itself after a transformation of the visual image, which can advantageously improve results otherwise obtained. In another embodiment of the invention, all of the processes described by the bullets above are used.

All of the above-described processes compute scalar values as results. However, the process-response statistical modeling approach of the invention is not limited to processes that produce scalar values as results. A process that produces a vector, matrix or tensor value can be used so long as the process can be represented in a statistical distribution such as a histogram, which can then be used for comparison of statistical profiles between visual images.

Processes need not be constrained to the data within a region. For example, the error between adjacent blocks horizontally (or any neighbor) can be computed, and the result assigned to the left block (or any kind of consistent assignment).

As indicated above, according to an aspect of the invention, the determination of similarity between visual images can be accomplished using process bootstrapping. Process bootstrapping involves defining one or more processes that use the results from other lower-level processes as input, rather than the raw image generation data. For example, a bootstrapping process can be defined that computes an average difference between a process result for a region and the process results for regions proximate to that region (e.g., the region's neighbors). If a process-response statistical modeling method according to the invention already included N processes, the addition of such bootstrapping processes would provide an additional N processes. Ways in which this aspect of the invention can be implemented are described in more detail below.

When using regularly-spaced uniform regions for a process-response statistical modeling method, the outputs from any scalar process can be stored in an array arranged in an image-like grid. Such regions actually do form a grid-like pattern over a visual image when overlaid upon the visual image. This grid of data can be used as if it were a grayscale image, and can be the input to more process-response statistical modeling analysis, such as that described above. This bootstrapping can continue indefinitely, in that a new grid can store results of processes acted upon this derived "image," creating yet another "image" which is a derivative of the derived "image," and so on.

To illustrate, the process in which the average value of each color channel for the pixels of a region is computed (for convenience, sometimes referred to hereafter as the "average color process") can be performed on each block of a visual image divided into 8×8 non-overlapping blocks. The results of the average color process can be put into a secondary grid, which is ⅛ in size in each dimension of the original visual image. (For the average color process, viewed as an image, a grid produced from the results of that process would look like the original visual image in miniature. For other processes, the image interpretation of a grid produced from the results of the process would look quite different.) That miniature "image" could then be subdivided into regions, each of which is processed to produce scalar results that can themselves be arranged into a grid, and so on.

The above-described bootstrapping of the average color process is available in particular and simple form on most graphics hardware, and is called a "mip-map" or Laplacian pyramid. Other more general methods involving image pyramids include Wavelet transforms. These are known as hierarchical image pyramids. The process bootstrapping method according to an aspect of the invention is also hierarchical in nature and is quite similar, with the following differences:

1. The regions can be allowed to overlap significantly, so each new grid of process results may not strictly be a ½ downsample in each dimension of the previous grid of process results.
2. The processes are not limited to simple low or high pass digital filtering
3. The processes may be different at each level
4. The result of one level may be input to more than one type of process to generate a next level, creating a more complex hierarchy
5. Several hierarchies of varying depth may be formed from one color channel Each derivative "image" can be termed a "response image." A response image is a grid of results for a particular process applied to each region of an input image, where the input image can either be the original visual image or another response image.

The values in each response image can be put into a histogram. Each such histogram is a representation of the statistical distribution of values within any response image, and the process-response statistical model for a visual image is the collection of histograms for the visual image and any response images. Statistical models other than histograms can be used to represent the distribution of values for a given response image and combined to produce a process-response statistical model for a visual image.

A process bootstrapping hierarchy can be arbitrarily complex. In order to decide upon a particular hierarchy for a given application, optimization techniques can be used. Due to the large parameter space, genetic algorithms, as known to those skilled in the art, can advantageously be used to optimize a process bootstrapping hierarchy. A set of visual images already divided into groups that should be considered "similar" is presented to each candidate solution (possible process bootstrapping hierarchy) in the genetic algorithm at any given stage. The visual images are processed according to the structure of the hierarchy defined by the candidate solution, and for each visual image the other visual images of the set are ranked by measured similarity. A candidate solution is considered "better" if more visual images from within its own group are near the top of this ranked list.

Weights can be applied to each response image histogram in the final similarity measure, giving more consideration to some processes than others. These weights can also be optimized using the same framework that generates a near-optimal process bootstrapping hierarchy, either separately or as part of a global optimization of all parameters. It can be desirable to optimize the weights separately due to the long running times of the optimization process.

Figure 3:
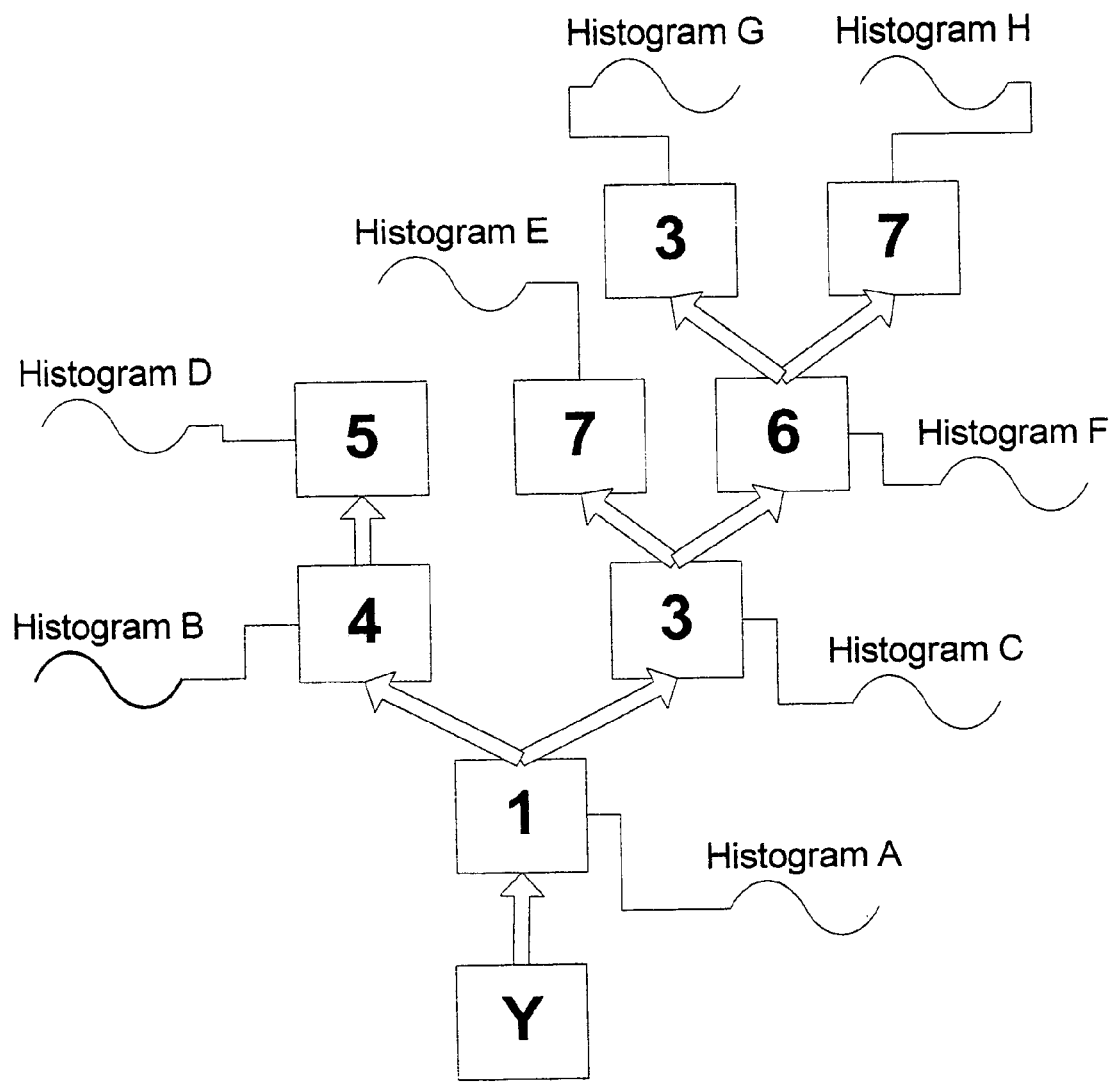
FIG. 3 illustrates process bootstrapping in accordance with an embodiment of the invention.

FIG. 3 illustrates process bootstrapping in accordance with an embodiment of the invention. FIG. 3 is a diagram of a hierarchy that generates eight histograms from the Y channel (e.g., a color channel). In FIG. 3, to simplify the illustration, the processes are numbered, but not specified. As an example, process 1 could be the error after a horizontal flip. If a process has output which acts as input to another process, this input/output is the "response image" of the first process. Each process generates a histogram (or other statistical model), which represents the distribution of values in its response image. More than one hierarchy can be combined to form the final complete process-response statistical model, however for this simple single-hierarchy case, the process-response statistical model is the collection of histograms A-H.

The processes (in the case, of process bootstrapping, the lowest level processes) of a process-response statistical modeling method according to the invention operate directly on the image generation data. In the typical scenario, visual images are solely defined by their colors: most typically, image generation data is color data in some color space, such as RGB. However, the image generation data can be represented in other color spaces and even though the visual image is originally defined in one color space, often it is possible to transform the visual image between color spaces. In particular, the image generation data can be represented in a perceptually uniform color space, such as an L*a*b* or an HCV (Munsell) color space. The image generation data can be presented in a color space that includes an intensity component, such as a Y component, a V component or an L component of the color space. A perceptually uniform color space is one in which the distance between two colors (measured using Godlove's formula) correlates well with the perceived (by a person) difference between those colors. In one aspect of the invention, the degree of similarity between two visual images is determined using one or more processes that operate on image generation data represented in a perceptually uniform color space. The use of a perceptually uniform color space has been found to be particularly useful in making accurate image similarity determinations. However, the image generation data need not necessarily be color data. Certain applications may benefit from using pixel depth or focus information, if available, for example.

D. Constructing Histogram(s) of Process Results

After running each of N processes on the set of regions of a visual image, each region will have N values computed as a result. From all of the regions, the values computed by process X can be collected and put into a histogram. Creation of a histogram for a process involves defining bins for process values (typically each bin includes a specified range of process values) and identifying for each bin the number of regions of the visual image for which the process produced a value included in the values specified for that bin (the number of regions is the bin value). The definition of bins can—and typically will—be specific to a process, since different processes will typically produce different ranges and types of values. It can be useful to normalize bin values: for example, each bin value can represent the percentage of all regions of the visual image having a process value that is among the values defined for that bin.

In general, a histogram for use in an embodiment of a process-response statistical modeling image similarity determination method according to the invention can be constructed in any appropriate manner. Examples of ways in which a histogram can be constructed are described below. Different ways of constructing a histogram can be mixed and matched within a process-response statistical model for a visual image: for example, process X can use one style of histogram construction while process Y can use another. This is possible because a process Y style histogram for one visual image will only be compared with other process Y style histograms for other visual images, so it is not necessary for process X style histograms to use process Y style histograms's construction method or vice versa.

1. Straight Histogram Construction

This type of construction builds a histogram that is a discrete version of the distribution of process values. For example, the histogram can be divided into N bins, each bin representing 1/N of the range of the process values. However, bins of other sizes can be used: the bins need not be of uniform size. Additionally, a process-response statistical modeling image similarity determination method according to the invention can be implemented so that the histogram is restricted to a particular sub-range of the process values that is deemed to be particularly appropriate for distinguishing visual images. In that case, process values that fall outside the range of the histogram can either be ignored or added into the first or last bin.

2. Chi-Square Style Construction

One popular way of determining if two distributions are similar is the Chi-Square test. This test theoretically assumes Gaussian distributions, but is often used on non-Gaussian distributions anyway. The Chi-Square test computes how many values in a test distribution are within each of a set of ranges defined by the parameters of a known distribution. The ranges are usually defined as deviations from a mean, and are usually of the scale of the standard deviation ($\sigma$). For example, a first range may be from 0 to $\sigma$ away from the mean, a second range may be from $\sigma$ to 2$\sigma$ away from the mean, and so on. The Chi-Square test counts up how many of the test distribution's values fall into each range, and computes a $\chi^2$ (Chi-Square) value which compares the expected number of values in each range from the known distribution with the observed number of values in each range from the test distribution. The Chi-Square value is given by the following equation:

$$\chi^2 = \sum_{k=1}^{n} (O_k - E_k)^2 / E_k$$

where there are n ranges, $E_k$ is the expected number of values from the known distribution in that range, and $O_k$ is the observed number of values from the test distribution in that range. To generate a histogram, using the Chi-Square test, for a set of process values for a visual image, each bin can represent, for example, the range of values deviating from the mean of the distribution of process values by a multiple of $\sigma$, e.g., the bins can be ranges of values from 0 to $\sigma$, 0 to $-\sigma$, 1$\sigma$ to 2$\sigma$, $-1\sigma$ to $-2\sigma$, etc. Such a histogram is a representation of the shape of the distribution of process values which is relatively independent of the mean and the variance of the distribution of process values. Construction of a histogram in this way can be useful if the shape of the distribution of process values is an important factor in determining similarity between two visual images (which may be the case with certain types of medical imagery). When a histogram is generated using the Chi-Square test, as discussed above, the measurement of similarity between the two visual images (i.e., the next step in a process-response statistical modeling image similarity determination method according to the invention) can be based on the chi-square value or, alternatively, the sum of the absolute values of the differences between corresponding bins of the histograms for the two visual images.

3. Kolmogorov-Smirnov Style Construction

Another popular way of determining if two distributions are similar is the Kolmogorov-Smirnov test. This test computes a cumulative distribution, rather than the straight distribution described above. In this case, each bin represents the probability of a value equal to or less than a maximum value represented by the bin, rather than simply the probability of a value in a unique range of values represented by the bin. When a histogram is generated using the Kolmogorov-Smirnov test, the measurement of similarity between the two visual images (i.e., the next step in a process-response statistical modeling image similarity determination method according to the invention) is computed as a D-statistic, which is essentially the maximum, over all sets of corresponding bins, absolute value of the difference between corresponding bin values of the histograms for the two visual images. If two straight histograms are represented by A and B, then the corresponding cumulative histograms are computed as follows:

$$a_i = \sum_{j=0}^{i} A_i \quad b_i = \sum_{j=0}^{i} B_i$$

The D-statistic is computed from the two cumulative histograms using the following equation:

$$D = \max(|a_i - b_i|), \forall i$$

Histograms constructed using cumulative distributions are useful in comparing arbitrary distributions and so can be especially useful in determining similarity between visual images for which processes produce values that have that characteristic (i.e., an arbitrary distribution). The D-statistic is essentially the application of an L-∞ norm to compute distance between cumulative distributions; the ultimate outlier-sensitive norm. Histograms constructed using cumulative distributions can be used with measurements of visual image similarity other than the Kolmogorov-Smirnov test. As an example of an alternative, distances (i.e., the degree of similarity of visual images) may be computed using an L-1 norm instead, which is the average absolute value of the difference between corresponding bin values of the histograms for the two visual images, and is far less sensitive to outliers. Also, robust norms such as the Geman-McClure norm may be used.

Figure 4:
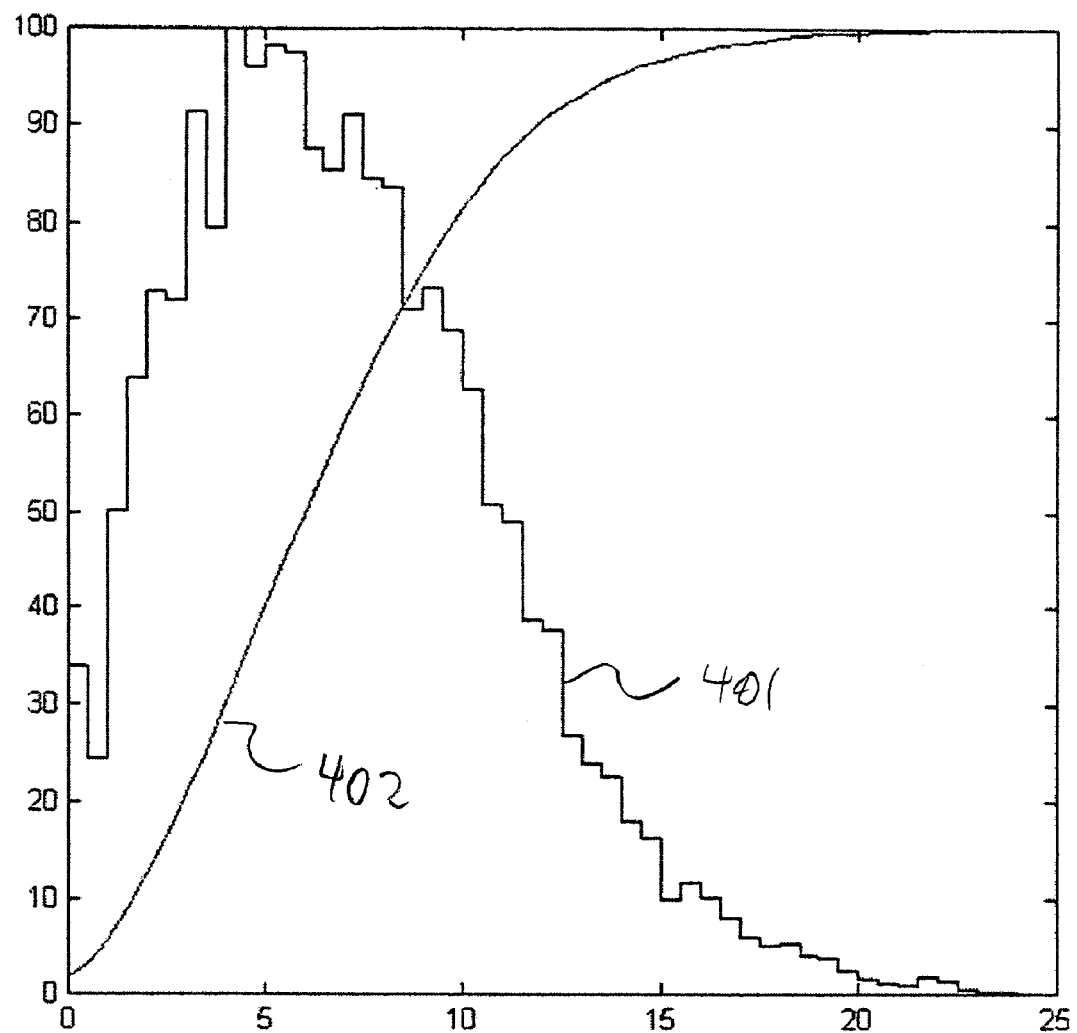
FIG. 4 is a graph illustrating two different types of histograms: a straight histogram and a cumulative histogram.

FIG. 4 is a graph illustrating two of the different types of histograms discussed above: a straight histogram 401 and a cumulative (e.g., Kolmogorov-Smirnov style) histogram 402. Both histograms have 25 bins and are normalized to have a maximum at 100.

E. Computing Similarity

Below, ways of computing similarity between two process-response statistical models (and, thus, the visual images they represent) are described for implementation of a process-response statistical modeling image similarity determination method according to the invention in which the statistical models are histograms. When statistical models other than histograms are used, other ways of computing similarity can be used, as necessary, appropriate or desirable for the statistical model used, as understood by those skilled in the art.

Computing similarity between two sets of histograms can be as simple as taking the sum of the absolute values of the differences in bin value for each pair of corresponding bins of the two sets of histograms. FIG. 5 illustrates normalized bin values for two cumulative distribution histograms and the absolute value of the difference for each corresponding pair of bins. A process-response statistical model may include multiple pairs of histograms such as the Histogram A and Histogram B in FIG. 5: in such case, computation of similarity in the manner now being described would entail adding all of the bin difference values for each pair of histograms (i.e., the values in the Difference column of FIG. 5 and similar values for the other pairs of histograms). This manner of computing image similarity tends to work quite well, especially when cumulative distributions are used.

It may be decided that certain processes contribute more value to recognizing image similarity than others. In this case, the results from pairs of histograms for individual processes can be weighted to reflect judgment about the differences in value of different processes: for example, processes that are deemed to contribute more value to recognizing image similarity can be weighted more strongly (e.g., given larger weights). Modifying the way of computing similarity discussed above, the similarity measure would then be the weighted sum of the absolute values of the differences in bin value for pairs of corresponding bins of the two sets of histograms (the weight for each pair of corresponding bins being established based on the process to which the bins correspond).

In general, it is desirable for sufficiently similar visual images to match well across all pairs of process histograms produced by a process-response statistical modeling image similarity determination method according to the invention. However, there are times when certain processes, for whatever reason, produce results that are way out of line with the rest of the processes. These can be considered outliers, if desired, and discarded from the analysis. A simple approach to discarding outliers can be to discard the process (or a specified number processes) producing the best result and the process producing the worst result (or a specified number processes). It is also possible to determine the difference between the worst and next worst processes (and/or best and next best processes) and discard the worst (and/or best) process if the difference exceeds a specified threshold. Other, more sophisticated methods for determining which processes should contribute to the image similarity determination for any particular pair of visual images can be employed. For example, in some applications where there is a small visual image dataset (so that the computation required by the following approach does not become prohibitive), an intelligent process can adaptively find the best M out of the potential N processes based on the given visual images and use only those in determining image similarity (e.g., using a genetic algorithm in a manner similar to that discussed above in the section on the process bootstrapping method).

In general, any method of computing similarity between two sets of histograms can be used in conjunction with a process-response statistical modeling image similarity determination method according to the invention. For example, the distance between two histogram vectors may be computed by determining the Euclidean distance (i.e., the square root of the sum of the squared differences of the histogram vector components) between the two. In a manner similar to that described above, the similarity of visual images would be computed by combining the distances between histogram vectors for some or all of the processes used in the method.

V. Use of Image Similarity in Interacting with a Collection of Visual Images

Below, various uses of image similarity determinations are described. Various aspects of the invention are embodied by such uses of image similarity. For those aspects of the invention, an image similarity determination method in accordance with the invention that makes use of process-response statistical modeling can be used and, often, the use of such method is particularly advantageous. However, more generally, those aspects of the invention can make use of any image similarity determination method, e.g., any image similarity determination method in which metadata regarding visual images is used to evaluate the similarity of those visual images.

A. Content-based Image Retrieval

Content-based image retrieval (CBIR) is one example of an application for which image similarity determinations can be used and, in particular, image similarity determinations produced using a process-response statistical modeling image similarity determination method as described herein. For example, in the latter case, a CBIR system in accordance with the invention can operate by analyzing an input visual image and constructing a process-response statistical model of the visual image. A database of visual images from which one or more visual images that match the visual image can be retrieved can have already been processed to produce process-response statistical models for those visual images that are available for comparison. The CBIR system would attempt to find the best match or matches for the input visual image by taking the process-response statistical model of the input visual image and finding the best match(es) among all process-response statistical models for the visual images in the database. The visual image(s) corresponding to the best process-response statistical model match(es) could then be retrieved and presented to a user.

In such a CBIR system, the process-response statistical models may be too large to enable efficient comparison when the database includes a very large number of visual images. In such case, one way to simplify the process-response statistical model is to consider just the mean and variance of the distributions of results for each process. This additional meta-information (an example of process bootstrapping, as described above) can be easily computed as part of a process-response statistical model construction process and stored with any process-response statistical model. A CBIR system in accordance with the invention may start by comparing only against mean and variance of individual distributions, which is potentially a couple of orders of magnitude fewer computations than full statistical model comparisons. Comparison of visual images could be accomplished, for example, by calculating the sum of squared or absolute differences between distribution means. This similarity comparison may be satisfactory enough to rule out a large number of the visual images in the database; then, for what remains, direct process-response statistical model comparisons can take place. The use of other such efficiency schemes can be envisioned, such as fixed-length bit signatures that represent highly quantized mean and variance values, which can be very rapidly used for quick comparisons, allowing a large number of the visual images of a very large database to be ruled out early in the process of reviewing the visual images of the database to identify match(es).

B. Indexing and Grouping Visual Images

In accordance with another aspect of the invention, the content of visual images in a collection of visual images is evaluated and the evaluation used to index the visual images of the collection (i.e., identify the location of visual images in the collection of visual images) and, in particular embodiments of this aspect of the invention, to group the visual images of the collection. The content of a visual image in a collection of visual images can be evaluated by determining the similarity of the visual image to one or more other visual images of the collection of visual images. In particular, image similarity can be determined using process-response statistical modeling as described herein. However, other image similarity determination methods can also be used. This aspect of the invention can be used generally to index or group visual images from a collection of still visual images (for convenience, sometimes referred to herein as photo grouping), visual images from a collection of visual images including one or more still visual images and one or more visual images from a visual recording, or visual images from a visual recording. This manner of indexing or grouping a collection of visual images can advantageously be implemented (in whole or in part), in particular, on apparatus having a primary purpose of recording and/or playing back visual images, as described above (e.g., a DVD recorder or player, a personal video recorder, a visual recording camera, a still visual image camera, a personal media recorder or player, or a mini-lab or kiosk). The indexed or grouped collection of visual images (and/or metadata describing the indexing or grouping) can be stored on, for example, a digital data storage medium or media, such as one or more DVDs and/or one or more CDs.

When grouping visual images in accordance with this aspect of the invention, the number of groups may or may not be established beforehand. In either case, a maximum number of visual images in a group may or may not be established beforehand (the maximum number of visual images in a group can be the same for all groups or can be different for different groups). The group to which a visual image is added can be based on a determination of the similarity of the visual image to the visual image(s), if any, of existing groups. For example, a visual image can be evaluated to determine whether the visual image has at least a specified degree of similarity to one or more other visual images of each group that already contains visual image(s) (e.g., at least a specified degree of similarity to one or more specified visual images of the group, at least a specified degree of similarity to each visual image of the group, at least a specified average degree of similarity to the visual image(s) of the group, or some combination of such constraints). If so, the visual image is assigned to one of those groups: for example, the visual image can be assigned to the group that includes the visual image(s) to which the to-be-assigned visual image is determined to be most similar. If not, then the visual image is assigned to a new group. The establishment of the number of groups and/or a maximum number of visual images per group constrains the grouping in a manner that may require assignment of a visual image to a group other than one to which the visual image would be assigned based solely on other constraint(s). For example, if a group already has the maximum number of allowed visual images, and it is determined that yet another visual image can be assigned to the group, the extra visual image can either be assigned to another group (perhaps the group including visual images to which the to-be-assigned visual image is next most similar) or the similarity of the visual image to other visual images of the group can be compared to that of visual images already in the group and the to-be-assigned visual image can replace another visual image of the group (which is then assigned to another existing group or used to start a new group, as appropriate) if deemed appropriate, e.g., if the to-be-assigned visual image is more similar to the other visual images of the group than one or more visual images already in the group (the visual image that is least similar to the other visual images of the group can be replaced, for example). As can be appreciated, there are a variety of different particular ways in which image similarity can be used to evaluate visual images in a collection of visual images to effect grouping of the visual images: the above describes some general considerations and illustrative particular implementations.

The use and operation of this aspect of the invention can be illustrated with respect to a particular embodiment of this aspect of the invention for use in photo grouping. It may be desired to organize still visual images of a collection of visual images into a set of logical groups. For instance, from a tourist's set of digitized photos of Disneyland and the greater Orange County area, all images of the Disneyland castle should perhaps be placed into a single group, either along with other Disneyland photos or in a group of their own if such a group is large enough. The Disneyland photos should be separated from other images (i.e., grouped), which may be pictures of the beach or some other semantic category. The invention can produce a process-response statistical model for each visual image of the group. The distance (i.e., similarity or dissimilarity) between each visual image pair is computed by comparing process-response statistical models. This distance measure can then be used to cluster (group) the visual images using an appropriate image clustering method, e.g., an agglomerative clustering method, such as that described in "Clustering by competitive agglomeration," by H. Frigui and R. Krishnapuram, Pattern Recognition, 30(7), 1997, the disclosure of which is hereby incorporated by reference herein. The clustering method can automatically decide how to group the visual images, based on the measure of similarity or dissimilarity between the visual images. The success of the clustering method is heavily dependent on the quality of the image similarity determination, which, as noted above, can be a process-response statistical modeling image similarity determination method as described herein. Though a particular clustering method is described above, other clustering methods can be used, as can be readily appreciated by those skilled in the art.

When grouping visual images in accordance with this aspect of the invention, the temporal order of acquisition of the visual images can be preserved or the visual images can be freely arranged in any order, the order based only on the evaluation of the content of (i.e., determinations of similarity between) the visual images. When the collection of visual images includes visual images from a visual recording, maintaining the temporal order of acquisition of the visual images is generally desirable since that is the manner in which the visual images typically have most meaning. Maintaining the temporal order of acquisition of the visual images may also be desirable when the collection of visual images only includes or primarily includes still visual images, based on an assumption that still visual images acquired close in time are likely to be of related content such that it is desired to keep those visual images together in a group (this can be true even when it is determined that temporally proximate visual images are dissimilar, e.g., visual images of two different rides at a theme park may look very different but it is likely that it is desired to keep those visual images together in the same group). The description below of a particular embodiment of a photo grouping system illustrates how an objective of maintaining the temporal order of acquisition of the visual images of a collection of visual images can be integrated with determinations of image similarity between visual images of the collection in producing a grouping of the collection of visual images.

C. Face Recognition

It is possible to frame face recognition as an image similarity problem. Although more sophisticated domain-specific methods exist for face recognition, the process-response statistical modeling approach can be used with some success in recognizing faces. Such a face recognition system would operate in a similar fashion as the CBIR system described above, in that a database of visual images including faces of known individuals would be available with pre-computed process-response statistical models. A visual image of an unidentified individual could be provided as input and the process-response statistical model of the input visual image computed. This process-response statistical model can then be compared against the process-response statistical models of visual images including faces of known individuals to try to find the best match. The system can claim that the best match found either identifies the individual in the input visual image as the one present in the visual image determined to be the best match, or that the best match image is the closest match from a facial similarity standpoint if the individual in the input visual image is not present in the database.

D. Video Summarization/Annotation

The invention can be used to summarize a visual recording (e.g., video) or collection of still visual images (or a combination of both). The invention can also be used to annotate groups of visual images in a collection of visual images (e.g., annotate scenes in a visual recording such as video). In accordance with further aspects of the invention, image similarity determinations can be made for visual images from a collection of visual images (i.e., visual images from a visual recording and/or still visual images) and used to facilitate or enhance creation of a summary of the collection of visual images or annotations of groups of visual images in the collection. In particular, a process-response statistical model as described herein can be used in effecting the image similarity determination. Ways in which such aspects of the invention can be implemented are described in more detail below.

For example, it may be desired that a video be divided into chapters for placement onto a DVD. To do so intelligently, it may be desired to identify sections of the video containing images that are perceptually similar. For example, it may desired to identify perceptually similar scenes (i.e., groups of content-related visual images). Perceptually similar scenes may contain the same or many of the same objects, may be shot with similar camera angles, etc. It may be desired to place all scenes that are sufficiently similar into the same chapter, subject to constraints on how large a chapter can be and the physical separation in the video of the similar scenes. This may also entail including intervening scenes that are not sufficiently similar: for example, in a video including a scene of a tree, followed by a scene of a car, followed by another scene of a tree, it may be desired (and the invention can be so implemented) to include in one group (e.g, DVD chapter) all of those scenes, even though the car scene will most likely not be determined to be similar to either of the tree scenes. The foregoing can be accomplished using the invention and, in particular, an aspect of the invention that makes use of image similarity to produce annotations regarding groups of visual images (e.g., scenes) in a collection of visual images (e.g., video).

According to an embodiment of the invention, groups of visual images in a collection of visual images can be annotated by identifying an image representation for each of the groups, determining the similarity of each of the image representations to each of the other image representations, and annotating the groups of visual images based on the similarity of each image representation to the other image representations. The image representation for a group of visual images can be a representative visual image selected from the group of visual images. The image representation of a group of visual images can also be an average of one or more image characteristics for all visual images of the group of visual images. Further, this embodiment of the invention can be implemented so that the image representation for all groups of visual images is a representative visual image selected from the group of visual images, so that the image representation for all groups of visual images is an average of one or more image characteristics for all visual images of the group of visual images, or so that the image representation for one or more of the groups of visual images is a representative visual image selected from the group of visual images and the image representation for one or more other groups of visual images is an average of one or more image characteristics for all visual images of the group of visual images. In the latter case, the one or more image characteristics can be ascertained for each representative visual image to enable comparison of the image representations. For either type of image representation, the process-response statistical model of a visual image as described elsewhere herein can be produced and used in the similarity determination: when the image representation is a representative visual image selected from the group of visual images a process-response statistical model of the representative visual image can be produced. When the image representation is an average of one or more image characteristics for all visual images of the group of visual images an average process-response statistical model of all visual images of group of visual images can be produced.

Annotation of the groups of visual images can be, for example, assigning each group of visual images to one of multiple groups of groups of visual images. For example, the collection of visual images can include a visual recording and the groups of visual images can be scenes in the visual recording. (The identification of scenes in a visual recording can be accomplished using any of a variety of known methods. For example, scenes can be identified in a visual recording using methods as described in the following commonly owned, co-pending United States patent applications: 1) U.S. patent application Ser. No. 09/595,615, entitled "Video Processing System," filed on Jun. 16, 2000; 2) U.S. patent application Ser. No. 09/792,280, entitled "Video Processing System Including Advanced Scene Break Detection Methods for Fades, Dissolves and Flashes," filed on Feb. 23, 2001, by Michele Covell et al.; and 3) U.S. patent application Ser. No. 10/448,255, entitled "Summarization of a Visual Recording," filed on May 28, 2003, by Subutai Ahmad et al. The disclosures of each of those applications are hereby incorporated by reference herein.) Annotation can then encompass putting the scenes into groups. For example, this aspect of the invention be used to group scenes into chapters for placement on a DVD when the visual recording is stored on that type of data storage medium.

To summarize a visual recording, typically it is desired to include only a few scenes of a particular type in the summary. To achieve this, sections of a video can be grouped or clustered in a manner similar to that described above with respect to implementation of the invention for photo grouping. Then, from each group, only a few (e.g., one or two) sections of the visual recording are selected, the assumption being that it is only necessary to include a small number of similar sections of the visual recording in order to convey the nature of the content of those similar sections, i.e. to provide a good summary of the visual recording. For specific applications, such as summarization of a sporting event, repetitive structure can be used to identify important parts of the game that are desirable to include in the visual recording summary. For instance, a standard camera angle and field of view are used whenever a pitch is thrown in baseball. Through computation of image similarity, a score can be computed for a scene that indicates how similar the scene is to a particular image (or type of image) that is not part of the visual recording, e.g., how similar a scene is to a "pitch is being thrown" image. (For convenience, such an image is sometimes referred to herein as a "master image.") The invention could be implemented so that all such scenes are required to be in the summary. In addition, it may be desired that the summarization method remove all scenes that contain close-ups of faces, since these often are irrelevant to the outcome of the game. This type of scene can also be recognized using an image similarity method according to the invention (e.g., by comparing to a "face image") and the corresponding scenes deleted from the summary. A scene (or other group of visual images) can be compared to an image by identifying an image representation of the scene (using any of the ways described above with respect to using image similarity in annotating groups of visual images) and comparing that to the image. Or, one or more visual images selected from the scene (or other group of visual images) can be compared to the image and the similarity of the scene to the image based on those comparisons (e.g., the average similarity of the selected visual image(s) can be computed).

A collection of still visual images can also be summarized using image similarity, in accordance with the invention. This can be accomplished in a variety of ways. For example, the invention can group the visual images of the collection using determinations of visual image similarity (as described elsewhere herein), then select a representative visual image from each group (as also described elsewhere herein) for inclusion in a summary of the collection. Or, the similarity of visual images of the collection to one or more specified visual images can be determined and visual images identified to be included in, or excluded from, a summary of the collection based on the image similarity determinations. The summarized collection of still visual images can then be presented as a slideshow, giving an overview of the content of the entire collection.

According to an embodiment of the invention, a collection of visual images (e.g., a visual recording) can be summarized by assigning each of multiple visual images of the collection of visual images (which can be all or substantially all of the visual images of the collection of visual images) to one of multiple groups of visual images based on the similarity of the visual image to one or more other visual images of the collection of visual images, then evaluating each of the multiple groups of visual images to identify one or more of the groups to include in the summary. Determination of the similarity between visual images can be accomplished, for example, using process-response statistical modeling, as described above.

The evaluation of groups of visual images for inclusion in the summary can be done by determining the similarity of each of the groups (using one or more visual images of the group or an image representation of the group, as discussed above) to one or more specified visual images (e.g., "master" image(s) that represent content that it is desired to include and/or exclude from the summary), and identifying one or more groups of visual images to be included in, or excluded from, the summary based on the similarity of the visual image or images of each group to the specified visual image or images. The identification of group(s) of visual images to be included in, or excluded from, the summary can be implemented, for example, so that each group of visual images for which the visual image(s) of the group have at least a specified degree of similarity to the specified visual image(s) are included in the summary. The identification of group(s) of visual images to be included in, or excluded from, the summary can be implemented, for example, so that a specified number of groups of visual images for which the visual image(s) of the group are determined to be the most similar to the specified visual image(s) are included in the summary. The identification of group(s) of visual images to be included in, or excluded from, the summary can be implemented, for example, so that each group of visual images for which the visual image(s) of the group have less than a specified degree of similarity to the specified visual image(s) are excluded from the summary. The identification of group(s) of visual images to be included in, or excluded from, the summary can be implemented, for example, so that a specified number of groups of visual images for which the visual image(s) of the group are determined to be the least similar to the specified visual image(s) are excluded from the summary. The identification of group(s) of visual images to be included in, or excluded from, the summary can be implemented, for example, so that each group of visual images for which the visual images of the group have at least a specified degree of similarity to the specified visual image or images is excluded from the summary. The identification of group(s) of visual images to be included in, or excluded from, the summary can be implemented, for example, so that a specified number of groups of visual images for which the visual images of the group are determined to be the most similar to the specified visual image or images are excluded from the summary. The identification of group(s) of visual images to be included in, or excluded from, the summary can be implemented, for example, so that each group of visual images for which the visual image(s) of the group have less than a specified degree of similarity to the specified visual image(s) are included in the summary. The identification of group(s) of visual images to be included in, or excluded from, the summary can be implemented, for example, so that a specified number of groups of visual images for which the visual image(s) of the group are determined to be the least similar to the specified visual image(s) are included in the summary.

E. Searching for Visual Images Via a Network of Computational Apparatus

In accordance with another aspect of the invention, image similarity determinations—and, in particular, image similarity determinations produced using a process-response statistical modeling image similarity determination method as described herein—can be used for searching for visual images via a network of computational apparatus (e.g., searching for visual images via the Internet and, in particular, via the World Wide Web part of the Internet). Below, this aspect of the invention is generally described as implemented to enable searching for visual images via a network of computational apparatus. However, determinations of the similarity between two visual recordings or between a visual recording and a visual image, as described above, can also be used in accordance with this aspect of the invention to enable searching for a visual image or a visual recording. The process-response statistical modeling described herein is simple enough, yet flexible enough to form the basis of a standard image similarity format, which can be advantageous in facilitating the use of image similarity determinations for searching for visual images via a network of computational apparatus. The absence of any assumptions regarding the nature of visual images is a major advantage of using the process-response statistical model as a standard format. In contrast, image similarity detection methods that make assumptions about what a visual image contains (i.e., domain-specific methods, such as some face recognition methods, as discussed above) are not robust, since there are always visual images that invalidate those assumptions. In those cases, a method that relies upon such assumptions will likely perform more poorly than a method (as image similarity detection methods that make use of process-response statistical modeling) that does not make any assumptions. In fact, a process-response statistical modeling image similarity determination method as described herein is able to be used in a robust manner on a wide variety of images with no tuning of parameters. As a consequence of the foregoing, visual images located at nodes of a network of computational apparatus (e.g., the World Wide Web) can be processed by a process-response statistical modeling method according to the invention with simple tools and no user intervention, thus facilitating searching of those visual images via the network based on provided visual image examples. However, while a process-response statistical modeling image similarity determination method as described herein can be advantageously used for searching for visual images via a network of computational apparatus, in general any image similarity determination method can be used.

Figure 6:
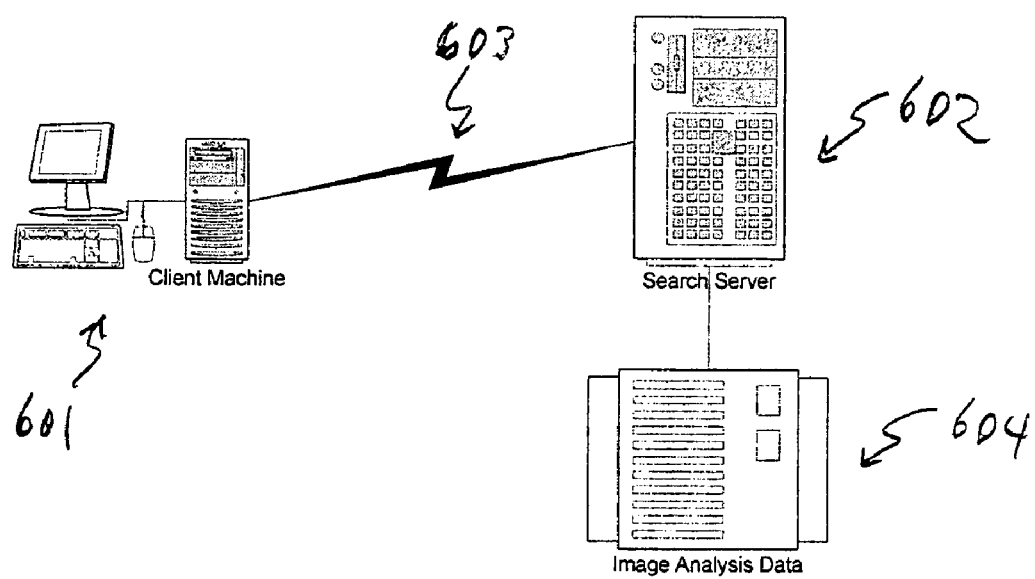
FIG. 6 illustrates a network system that can be used to implement visual image searching in accordance with the invention.

This aspect of the invention can be implemented using a client-server system, as illustrated in FIG. 6, which includes a client machine 601 communicating via a network 603 with a search server 602 that has access to data 604 that enables image similarity determination with respect to a collection of candidate visual images. In particular, this aspect of the invention enables searching for visual images located at nodes (i.e., a copy of the image generation data for the visual images is stored at those nodes) other than the nodes at which the client machine 601 and search server 602 are located.

Typically, the client machine 601 and search server 602 are located at different nodes of the network. Nodes at which visual images can be located are different from the node at which the client machine 601 is located and, often, the node at which the search server 602 is located. The client machine 601, search server 602 and network 603 can be implemented by any appropriate apparatus: for example, the client machine 601 and search server 602 (as well as apparatus at other nodes of the network) can each be implemented by one or more computers (which can be, for example, a conventional desktop computer, server computer or laptop computer, a cell phone, or a personal digital assistant) and, as necessary or desirable, one or more peripheral devices (e.g., printer, separate data storage medium, separate drive for specified data storage medium). The collection of candidate visual images can include one or more still visual images and/or one or more visual images from one or more visual recordings. The data 604 can include image generation data representing the candidate visual images and/or image metadata (e.g., data representing process-response statistical models) regarding the candidate visual images; if the latter is not present, the search server 602 has the capability to determine the metadata from image generation data (e.g., can make use of one or more computer programs to analyze the image generation data to determine the metadata, for example, determine process-response statistical models from the image generation data). One or more computer programs for implementing, in whole or in part, a method in accordance with the invention for use in searching for a visual image via a network can be embodied as a client application, a server application, and/or as software embedded in a Web browser. Any communications protocol appropriate for the network for which the invention is implemented can be used: for example, when the invention is used for searching for a visual image via the World Wide Web, an HTTP communications protocol can be used.

For example, a Web-based interface can enable a user-provided visual image (a "search visual image," represented by image generation data, which can be one example of what is sometimes referred to herein as "image search data," i.e., data representing the content of the search visual image that can be used in effecting the search for visual image(s) having a specified degree of similarity to the search visual image) to be uploaded from the client machine 601 to the search server 602. The search server 602 can then process the search visual image to produce metadata regarding the search visual image (e.g., a process-response statistical model, such as a set of process-response histograms). The search server 602 can then compare this metadata to metadata for candidate visual images and identify as matching visual image(s) the candidate visual images that are determined to meet specified similarity criter(ia), using a method according to the invention as described herein or another image similarity detection method. In general, the metadata can include any image descriptors that depend only on image generation data; in particular, the process-response statistical modeling approach described herein can be used. For example, the matching visual image(s) can be candidate visual image(s) having greater than a specified degree of similarity to a search visual image, or the matching visual image(s) can be candidate visual image(s) that are determined to be most similar to the search visual image. The candidate visual images can have been collected or identified in any manner. For example, the search server 602 can use a Web crawling application to locate visual images at other nodes of the Web to use as candidate visual images (a candidate visual image located at another node can be acquired and stored by the search server 602 or identification of the node at which a candidate visual image was found can be retained to enable later retrieval of the candidate visual image). Matching candidate visual image(s) can be provided to the client machine 601 (where they can be displayed by the client machine 601 using a web browser or other software for displaying visual images, stored, printed, modified and/or used in any other manner enabled by the client machine 601) or used for some other purpose by the search server 602 (e.g., used to print the visual images on photographic paper to be sent to a user of the client machine 601 who requested or performed the visual image search).

The above-described method of searching by providing image generation data from the client machine 601 to the search server 602 can be problematic and time consuming. Image generation data for large visual images can be over four megabytes in size, making it impractical to upload such visual images to the search server 602. This problem can be alleviated by producing appropriate metadata regarding a search visual image at the client machine 601 and sending only the metadata to the search server 602. (In such case, the metadata is image search data provided by the client machine 601 to the search server 602.) This can be accomplished by a standalone image analysis application that runs on the client machine 601 and generates the metadata for later transmission (e.g., via a manual Web-upload) to the search server 602, or this can be done by software embedded into a web browser (e.g., an ActiveX control or Java applet), which may then be capable of both generating the metadata and transmitting the metadata to the search server 602. The search server 602 receives a search request which includes the metadata. If the metadata is compatible with the metadata stored or computed by search server 602 for the candidate visual images, the search visual image metadata can then be directly compared to metadata for the candidate visual images to identify matching visual image(s). As indicated above, the matching visual image(s) can be provided to the client machine 601 via the network 603 or used for some other purpose.

The advantage of the above-described approach is that only the search visual image metadata must be transmitted, instead of the image generation data representing the search visual image, thus significantly reducing required bandwidth. For such an approach to work, the client machine 601 and search server 602 must format visual image metadata in the same way. This can be achieved, for example, in either of two ways. The first way is to define a flexible, open standard for the visual image metadata. In this case, the client machine 601 may produce visual image metadata one of numerous different ways, and if the search server 602 supports that method (meaning, the search server 602 has already processed, or can process, the candidate visual images for comparison by that method), the client machine 601 and search server 602 will be able to successfully perform the transaction.

The second way is for the visual image metadata to be generated by a proprietary method. In this case the details of the metadata are not known. The search server 602 will process all of the candidate visual images using this method, and will provide computer program(s) to the client machine 601 (e.g., via download from the Web or automatic download as ActiveX/Java embedded client software) that can produce visual image metadata that is compatible with that produced by the search server 602. The client machine 601 and search server 602 can communicate via an HTTP communication protocol to guarantee that they agree on the visual image metadata; if they do not, the user at the client machine 601 can be prompted to update the computer program(s) operating on the client machine 601.

Another possibility for alleviating difficulties associated with provision of image generation data from the client machine 601 to the search server 602 is to provide image generation data that represents a "thumbnail" (i.e., a lower resolution version) of the search visual image. A much smaller amount of image generation data is needed to represent a thumbnail of the search visual image, thus significantly reducing required bandwidth for transmission of image search data from the client machine 601 to the search server 602. As with the image generation data representing the full-resolution search visual image, the image generation data representing the thumbnail is processed by the search server 602 to produce metadata regarding the thumbnail (e.g., a process-response statistical model, such as a set of process-response histograms), which is then compared to metadata for candidate visual images to enable identification of matching visual image(s). As discussed above, prior to producing metadata regarding the thumbnail, it is desirable to scale the thumbnail so that the thumbnail has the same (or nearly the same) resolution as the candidate visual images to facilitate meaningful comparison of statistics.

Still another possibility for providing image search data is for the client machine 601 to provide to the search server 602 an identification of the search visual image (which includes explicitly or implicitly an identification of the location on the network of image search data regarding the search visual image) and/or image search data regarding the search visual image that enables the search server 602 to retrieve image search data from another node of the network or to identify that image search data is already present on the search server 602. Or, the client machine 601 can cause the image search data to be provided to the search server 602 from another node of the network. In any of the above cases, the search server 602 subsequently proceeds with producing metadata regarding the search visual image, if not already provided or computed, then comparing metadata for candidate visual images to that of the search visual image to enable identification of matching visual image(s).

As methods used in image similarity determination change over time, it is straightforward (yet perhaps time consuming) to change the image similarity determination method used. For the example of the proprietary method, replacing the image similarity determination method requires three steps. First, all candidate visual images at the search server 602 are analyzed and appropriate metadata generated for the candidate visual images. Second, the old metadata for the candidate visual images is replaced with the new metadata. Third, new computer program(s) are transmitted to the client machine 601 to replace the computer program(s) previously used to produce visual image metadata.

As indicated above, candidate visual images can be identified by the search server 602 using a web crawler. The search server 602 can use the web crawler to crawl the web for visual images to analyze and, upon finding a visual image, analyze it with the latest version of the image analysis software and store the metadata along with any other data (web URLs, contextual data, etc.) that may either aid in performing a search or aid in later retrieval of the candidate visual image. The web crawler can download and store the candidate visual image, or merely store the URL of the candidate visual image. In the latter case, verification that the candidate visual image is still available online will be necessary on a periodic basis.

As indicated above, this aspect of the invention can be embodied by using process-response statistical modeling as described herein to determine image similarity. This method fits the requirements of the network search application, and is simple enough that it could form the basis of an open standard for determining visual image similarity. Process-response statistical modeling has other benefits for use in this aspect of the invention. The amount of data representing a process-response statistical model is far smaller than the amount of image generation data required to represent a full visual image; this can make uploads of search requests fast when metadata is provided to the search server rather than image generation data. Producing a process-response statistical model can be done quickly: computer program(s) to produce a process-response statistical model can be implemented to require a second or less to process a typical visual image. The metadata produced is fixed in size. Also, results have been demonstrated to be good for a variety of semantic test databases.

F. Keyframe Selection

In accordance with another aspect of the invention, image similarity determinations can be used in selecting a representative visual image (sometimes referred to as a "keyframe") for a group of visual images (e.g., the visual images constituting a scene or other part of a visual recording, a collection of still visual images, an entire visual recording, or some combination of the foregoing). This manner of keyframe selection can advantageously be implemented (in whole or in part), in particular, on apparatus having a primary purpose of recording and/or playing back visual images, as described above. The similarity of pairs of visual images of a group of visual images can be determined and these image similarity determinations used to select the representative visual image. In using image similarity to select a representative visual image for a group of visual images in accordance with the invention, the similarity of a pair of visual images can be determined, for example, using any of the image similarity determination methods described herein; however, other image similarity determination methods can also be used. The image similarity determinations can be used to select the representative visual image by, for example, combining image similarity determinations for each of multiple visual images of the group, comparing the combined image similarity determinations for visual images of the group, and selecting a representative visual image based on the comparison. For instance, a similarity score can be calculated for a pair of visual images of a group of visual images that represents how similar the two visual images are. The similarity scores for a visual image can be combined (e.g., summed, averaged) to produce an overall similarity score that describes the similarity of that visual image to other visual images of the group. The visual image with the lowest sum or average (assuming a lower score means more similar or, if vice versa, the visual image with the highest sum or average) is considered to be the most similar to other visual images of the group and can, therefore, be selected as the best representative of the group.

This aspect of the invention (use of image similarity determinations in selecting a keyframe from a group of visual images) can be implemented so that each possible pair of visual images of a group of visual images is evaluated to determine the similarity of the visual images. This need not necessarily be the case, though: this aspect of the invention can also be implemented so that image similarity determinations are not made for one or more visual images of a group and/or so that image similarity determinations for one or more visual images of a group are not made with respect to all of the other visual images of the group. For example, in selecting a keyframe for a part of a visual recording it may be deemed desirable to exclude from the image similarity determinations one or more visual images that are determined to be blank frame(s). (A "blank frame" is a frame of visual recording data that does not correspond to recorded visual content and can be identified in any suitable manner, such as by using a method described in commonly owned, co-pending U.S. patent application Ser. No. 10/083,676, entitled "Identification of Blank Segments in a Set of Visual Recording Data," filed on Feb. 25, 2002, by Michele Covell et al., the disclosure of which is hereby incorporated by reference herein). However, implementing keyframe selection in accordance with this aspect of the invention so that each visual image of a group is compared to each other visual image of the group can advantageously enhance the capability of the keyframe selection to work well with any group of visual images and, in particular, a group of visual images including visual images representing a wide variety of content, in contrast to some previous approaches to keyframe selection that assume that most of the visual images of the group of visual images are visually very similar. Additionally, when the number of visual images that might otherwise be excluded is small relative to the number of visual images in the group (and even more so when those visual images are known or expected to be very different from the rest of the visual images of the group)—as will typically be the case, for example, if the visual images that might be excluded are blank frames in part or all of a visual recording—the inclusion of such visual images in the evaluation will typically not significantly affect the keyframe determination anyway. Further, evaluating all pairs of visual images can eliminate the need to evaluate visual images of the group to identify which visual images are to be excluded from the keyframe determination, which may otherwise undesirably make the process of keyframe determination longer and/or more complex.

This aspect of the invention can also be implemented so that the quality of visual images of a group of visual images is also determined, in addition to the image similarity determinations, and used in selecting a representative visual image for the group. Determination of image quality can be made for each image for which image similarity is determined (which can include all or some of the visual images of the group, as discussed above). For example, keyframe selection in accordance with the invention can be implemented so that only those visual images that satisfy particular image quality criter(ia) can be allowed to be selected as a keyframe. (If none of the visual images satisfy the image quality criter(ia), the use of such image quality determination can be ignored.) For instance, the keyframe for a group of visual images can be selected as the visual image having the highest degree of similarity to other visual images of the group that also satisfies one or more image quality criteria. Or, for example, the image quality determinations for the visual images can be combined with the image similarity determinations for the visual images and the combination used to select the keyframe. For instance, a similarity score and a quality score can be determined for each of multiple visual images of a group of visual images, the scores can be weighted as deemed appropriate (e.g., the weight of the similarity score can be made greater than that of the quality score), the scores combined, and the visual image having the highest or lowest combined score (depending on whether the increasing desirability of a visual image is represented by a higher or lower score) selected as the keyframe. The quality of a visual image can be determined using any of a variety of methods. For example, any of the methods for determining visual image quality described in commonly owned, co-pending U.S. patent application Ser. No. 10/198,602, entitled "Automatic Selection of a Visual Image or Images from a Collection of Visual Images, Based on an Evaluation of the Quality of the Visual Images," filed on Jul. 17, 2002, by Michele Covell et al., the disclosure of which is hereby incorporated by reference herein, can be used in embodiments of the invention. For instance, as described in U.S. patent application Ser. No. 10/198,602, the quality of a visual image can be determined based upon an image variation evaluation that evaluates the amount of variation within an image, an image structure evaluation that evaluates the amount of smoothness within an image, an inter-image continuity evaluation that evaluates the degree of similarity between an image and the immediately previous image in a chronological sequence of images, and/or an edge sharpness evaluation that evaluates the amount of "edginess" (i.e., the presence of sharp spatial edges) within an image. The determination of the quality of a visual image in an embodiment of the invention can be based on one or any combination of such evaluations. Further, the quality determination for each type of evaluation can be based on any appropriate quality criteria, such as quality criteria discussed in U.S. patent application Ser. No. 10/198,602.

A keyframe can be selected in ways other than by evaluating image similarity, as described above, and those other ways can be used in embodiments of other aspects of the invention that can make use of selection of keyframe(s). A keyframe can be identified, for example, using any of the methods described in the following commonly owned, co-pending United States patent applications, referenced more fully above, the description of each of which is incorporated by reference herein: 1) U.S. patent application Ser. No. 09/792,280, 2) U.S. patent application Ser. No. 10/198,602, and 3) U.S. patent application Ser. No. 10/448,255. For example, a keyframe can be selected based on the locations of visual images in a group of visual images (the visual images being arranged in a particular order within the group). For instance, a visual image can be identified as a keyframe or not based on a specified relationship of the visual image to one or more other visual images in a group of visual images (e.g., a keyframe is specified to be the nth visual image from the beginning or end of a group of visual images, such as the first or last visual image of a group of visual images) or based on a specified temporal relationship of the visual image to one or more other visual images in the group of visual images (e.g., a keyframe is the visual image that occurs a specified duration of time from the beginning or end of a group of visual images). As can be appreciated, other ways of selecting a keyframe that are not based on image similarity, such as selecting a keyframe based on the location of visual images in a group of visual images, can be used together with image similarity (and image quality, if desired) in the same or similar manner as described above for use of image quality together with image similarity in selecting a keyframe. For example, a keyframe can be selected so that only those visual images that satisfy particular image position constraint(s) can be allowed to be selected as a keyframe (as with image quality, if none of the visual images satisfy the image position constraint(s), image position can be ignored), e.g., the keyframe for a group of visual images can be selected as the visual image having the highest degree of similarity to other visual images of the group that also satisfies one or more image position constraints, such as a specified degree of proximity to the beginning of the group of visual images. Or, for example, image position determinations for visual images can be combined with image similarity determinations for those visual images (and, if desired, image quality determinations) and the combination used to select a keyframe, e.g., a keyframe is selected based upon a weighted average of an image similarity score and an image position score (and, if included as part of the evaluation of the visual images, an image quality score). Selecting a keyframe based (entirely or partly) on the location of visual images in a group of visual images can be particularly appropriate when the visual images are arranged in temporal order of acquisition within the group, as is the case in a visual recording or part of a visual recording. For example, this manner of selecting a keyframe can advantageously be used in selecting a keyframe for a scene of a visual recording.

Selection of a keyframe for a group of visual images can be facilitated by organizing the visual images of the group into sub-groups. Determinations of image similarity can be used to organize the visual images of a group into sub-groups of visual images that are determined to be sufficiently similar to each other (such sub-grouping can, but need not necessarily, make use of methods described elsewhere herein for grouping visual images based on image similarity determinations). The largest sub-group of visual images can then be selected for further processing (the assumption being that the largest sub-group of similar visual images includes visual images that best represent the entire group of visual images) in accordance with the description above of keyframe selection to select a keyframe for the sub-group of visual images which is, in turn, selected as the keyframe for the entire group of visual images.

IV. Example of a Photo Grouping System

The image similarity method according to the invention described herein has been implemented in a photo grouping system according to a particular embodiment of the invention, described in detail in this section. The system organizes a set of digital pictures, creates a slideshow of the pictures, and records the slideshow onto a DVD along with a convenient user-interface. Creation of the slideshow involves creating video frames from the digital pictures and encoding the video frames into an MPEG-2 bit stream, both of which can readily be accomplished by those skilled in the art. The video frames can be generated in a manner consistent with a visually pleasing slideshow. For example, video frames can be generated to simulate editing effects (such as a horizontal pan, a vertical pan, a fade, a pixelation transition or any other effect that can be found in professionally edited video) in the display of a picture, if appropriate for that picture. Such editing effects can be produced using methods known to those skilled in the art. Creation of the video frames can involve performing cropping or re-sampling operations on the original visual images, which is readily understood and can be accomplished by those skilled in the art.

The user experience can be further heightened through the creation of a user interface that is friendly (easy to use) and efficient (minimizes wasted user interaction). DVDs contain menus which allow users to navigate the content on the DVD by selecting chapters. A chapter in a DVD is essentially a section of content, e.g., a section of movie content. Ideally for the user, the images are intelligently grouped into chapters, so that each chapter contains a coherent theme of pictures. To select a chapter, the user ideally has an intelligently-selected representative of the group as a thumbnail in the menu system.

The photo grouping system can use image similarity to determine how best to generate the menu system, in order to achieve as near as possible the ideal experience for the user. The photo grouping system can be implemented so that the photos must remain in the original order (this can be desirable if it is believed that pictures are provided by a user in the order that the user wants them to appear in the slideshow). The photo grouping system then begins with an even division of the images into roughly equal groups. The photo grouping system then computes the similarity between all pairs of images that may potentially be placed together in a group, given a maximum number of images per group. If the maximum group size is N, then similarity is computed between each visual image and any other visual image N−1 or fewer spaces away in the original order. For a set of M images, this requires NM similarity computations.

The system then sorts all of the NM pairs from most similar to least similar. The list is then traversed, beginning with the most similar pair of images. For each pair in the list, the system attempts to put the image pair into the same group. It does so by moving the group boundaries, hereafter known as dividers. All dividers separating the current pair of images, if any, are moved so that they no longer separate those images. This is done iteratively, traversing the list in order of decreasing similarity, by moving dividers one direction or the other one space at a time, until a stable divider configuration is attained.

There may be a minimum group size, in which case the dividers are not allowed to be within a certain distance of each other. Thus, the movement of one divider may require other dividers to move, in order to maintain the minimum group size. If a stable divider configuration cannot be attained, the images are not placed in the same group, and the next pair of images in the list is accessed. The dividers are put back in the positions they were in at the beginning of consideration of this pair of images. If a stable divider configuration is attained, then from that time onward, dividers are no longer allowed to be placed between that image pair. The system continues moving dividers until there are no more allowable moves for the dividers to make.

After the divider configuration has stabilized, the most similar images should ideally be grouped together. This is pleasing to a user who may appreciate chapters containing semantically related content. At this point, a good image to represent each group is selected. This can be done as described above with respect to the section keyframe selection. These images will be used to create menu thumbnails. If chosen properly, these thumbnails will be good representatives of the groups, and will remind a user of what is contained within the groups. These images may also be placed on the DVD case itself, allowing quick visual identification of the DVD contents. Methods and apparatus as described in commonly owned, co-pending U.S. patent application Ser. No. 10/198,007, entitled "Digital Visual Recording Content Indexing and Packaging," filed on Jul. 17, 2002, by Harold G. Sampson et al., and U.S. Provisional Patent Application Ser. No. 60/613,802, entitled "Case For Containing Data Storage Disk(s), Including Cover With Transparent Pocket(s) For Insertion of Content Identification Sheet(s) Printed on Photographic Paper," filed on Sep. 27, 2004, by Gregory J. Ayres et al., the disclosures of each of which are hereby incorporated by reference herein, can be used.

Various embodiments of the invention have been described. The descriptions are intended to be illustrative, not limiting. Thus, it will be apparent to one skilled in the art that certain modifications may be made to the invention as described herein without departing from the scope of the claims set out below.

We claim:

1. A method for determining image similarity, using apparatus having computational capability to perform the steps of:
   performing a process on the image data of each of a plurality of regions of a first visual image, wherein the process measures the error of a region of a visual image with itself after a transformation of the visual image including the region;
   performing the process on the image data of each of a plurality of regions of a second visual image, each region of the plurality of regions of the second visual image corresponding to a region of the plurality of regions of the first visual image;
   comparing the measured errors of the plurality of regions of the first visual image to the measured errors of the corresponding regions of the second visual image; and
   specifying the degree of similarity between the first and second visual images based on the comparison of the measured errors of the regions of the first and second visual images.

2. A method as in claim 1, wherein the process measures the perceptual error of a region of a visual image with itself after a transformation of the visual image including the region.

3. A method as in claim 1, wherein the transformation comprises an affine transformation of the visual image.

4. A method as in claim 1, wherein the transformation comprises flipping the visual image with respect to an axis bisecting the visual image.

5. A method as in claim 1, wherein the transformation comprises rotating the visual image about the center of the visual image from a first orientation to a second orientation that is different from the first orientation.

6. A method as in claim 1, wherein the image data of regions of the first and second visual images is presented in a color space that includes an intensity component.

7. A method as in claim 6, wherein the intensity component is a Y component of the color space.

8. A method as in claim 6, wherein the intensity component is a V component of the color space.

9. A method as in claim 6, wherein the intensity component is an L component of the color space.

10. A method as in claim 1, further comprising the steps of:
    performing a second process on the image data of each of the plurality of regions of the first visual image, wherein the second process is different from the first process;
    performing the second process on the image data of each of the plurality of regions of the second visual image;
    comparing the results of the second process performed on the image data of regions of the first visual image to the results of the second process performed on the image data of corresponding regions of the second visual image; and
    wherein the step of specifying the degree of similarity between the first and second visual images is further based on comparison of the results of the second process performed on corresponding regions of the first and second visual images.

11. A computer readable storage medium or media encoded with one or more computer programs and/or data structures for use by apparatus having computational capability in performing functions that enable determining image similarity, comprising:
    computer code for performing a process on the image data of each of a plurality of regions of a first visual image, wherein the process measures the error of a region of a visual image with itself after a transformation of the visual image including the region;
    computer code for performing the process on the image data of each of a plurality of regions of a second visual image, each region of the plurality of regions of the second visual image corresponding to a region of the plurality of regions of the first visual image;
    computer code for comparing the measured errors of the plurality of regions of the first visual image to the measured errors of the corresponding regions of the plurality of regions of the second visual image; and computer code for specifying the degree of similarity between the first and second visual images based on the comparison of the measured errors of the regions of the first and second visual images.

12. A method for determining image similarity, using apparatus having computational capability to perform the steps of:

performing a process on the image data of each of a plurality of regions of a first visual image, wherein the image data of regions of the first visual image is presented in a perceptually uniform color space, wherein the process comprises the step of measuring the error of each region with itself after a transformation of the visual image including the region;

performing the process on the image data of each of a plurality of regions of a second visual image, each region of the plurality of regions of the second visual image corresponding to a region of the plurality of regions of the first visual image, wherein the image data of regions of the second visual image is presented in a perceptually uniform color space;

comparing the results of the process performed on the image data of regions of the first visual image to the results of the process performed on the image data of corresponding regions of the second visual image, wherein the step of comparing comprises the step of comparing the measured errors of the plurality of regions of the first visual image to the measured errors of the corresponding regions of the second visual image; and specifying the degree of similarity between the first and second visual images based on the comparison of the results of the process performed on corresponding regions of the first and second visual images, wherein the step of specifying the degree of similarity between the first and second visual images comprises the step of specifying the degree of similarity between the first and second visual images based on the comparison of the measured errors of the regions of the first and second visual images.

13. A method as in claim 12, wherein the perceptually uniform color space is a Munsell color space.

14. A method as in claim 12, wherein the perceptually uniform color space is an L*a*b* color space.

15. A method as in claim 12, wherein the transformation comprises an affine transformation of the visual image.

16. A method as in claim 12, further comprising the steps of:

performing a second process on the image data of each of the plurality of regions of the first visual image, wherein the second process is different from the first process;

performing the second process on the image data of each of the plurality of regions of the second visual image;

comparing the results of the second process performed on the image data of regions of the first visual image to the results of the second process performed on the image data of corresponding regions of the second visual image; and wherein the step of specifying the degree of similarity between the first and second visual images is further based on comparison of the results of the second process performed on corresponding regions of the first and second visual images.

17. A computer readable storage medium or media encoded with one or more computer programs and/or data structures for use by apparatus having computational capability in performing functions that enable determining image similarity, comprising:

computer code for performing a process on the image data of each of a plurality of regions of a first visual image, wherein the image data of regions of the first visual image is presented in a perceptually uniform color space, wherein the process comprises the step of measuring the error of each region with itself after a transformation of the visual image including the region;

computer code for performing the process on the image data of each of a plurality of regions of a second visual image, each region of the plurality of regions of the second visual image corresponding to a region of the plurality of regions of the first visual image, wherein the image data of regions of the second visual image is presented in a perceptually uniform color space;

computer code for comparing the results of the process performed on the image data of regions of the first visual image to the results of the process performed on the image data of corresponding regions of the second visual image, wherein the step of comparing comprises the step of comparing the measured errors of the plurality of regions of the first visual image to the measured errors of the corresponding regions of the second visual image; and computer code for specifying the degree of similarity between the first and second visual images based on the comparison of the results of the process performed on corresponding regions of the first and second visual images, wherein the step of specifying the degree of similarity between the first and second visual images comprises the step of specifying the degree of similarity between the first and second visual images based on the comparison of the measured errors of the regions of the first and second visual images.

18. A method for determining image similarity, using apparatus having computational capability to perform the steps of:

performing a first process on the image data of each of a plurality of regions of a first visual image;

performing a second process, for each of the plurality of regions of the first visual image, using the result of the first process for the region;

performing the first process on the image data of each of a plurality of regions of a second visual image, each region of the plurality of regions of the second visual image corresponding to a region of the plurality of regions of the first visual image;

performing the second process, for each of the plurality of regions of the second visual image, using the result of the first process for the region;

comparing the results of the first and second processes, or the second process, for the first visual image to, respectively, the results of the first and second processes, or the second process, for the second visual image; and specifying the degree of similarity between the first and second visual images based on the comparison of the results of the process or processes for the first and second visual images, and wherein each of the steps of performing a second process comprises the step of calculating, for each region, the average difference between the result of the first process for that region and the result of the first process for each of a plurality of proximate regions.

19. A method as in claim 18, wherein the step of comparing comprises the step of comparing the results of the second process for the first visual image to the results of the second process for the second visual image.

20. A method as in claim 18, wherein the step of comparing comprises the step of comparing the results of the first and second processes for the first visual image to, respectively, the results of the first and second processes for the second visual image.

21. A method as in claim 18, wherein the first process comprises the step of measuring the error of each region with itself after a transformation of the visual image including the region.

22. A method as in claim 21, wherein the transformation comprises an affine transformation of the visual image.

23. A method as in claim 18, wherein the image data of regions of the first and second visual images is presented in a perceptually uniform color space.

24. A computer readable storage medium or media encoded with one or more computer programs and/or data structures for use by apparatus having computational capability in performing functions that enable determining image similarity, comprising:
  computer code for performing a first process on the image data of each of a plurality of regions of a first visual image;
  computer code for performing a second process, for each of the plurality of regions of the first visual image, using the result of the first process for the region;
  computer code for performing the first process on the image data of each of a plurality of regions of a second visual image, each region of the plurality of regions of the second visual image corresponding to a region of the plurality of regions of the first visual image;
  computer code for performing the second process, for each of the plurality of regions of the second visual image, using the result of the first process for the region;
  computer code for comparing the results of the first and second processes, or the second process, for the first visual image to, respectively, the results of the first and second processes, or the second process, for the second visual image; and
  computer code for specifying the degree of similarity between the first and second visual images based on the comparison of the results of the process or processes for the first and second visual images, and
  wherein computer code for performing the second process comprises the computer code for calculating, for each region, the average difference between the result of the first process for that region and the result of the first process for each of a plurality of proximate regions.

25. A computer readable storage medium or media as in claim 11, wherein the process measures the perceptual error of a region of a visual image with itself after a transformation of the visual image including the region.

26. A computer readable storage medium or media as in claim 11, wherein the transformation comprises an affine transformation of the visual image.

27. A computer readable storage medium or media as in claim 11, wherein the transformation comprises flipping the visual image with respect to an axis bisecting the visual image.

28. A computer readable storage medium or media as in claim 11, wherein the transformation comprises rotating the visual image about the center of the visual image from a first orientation to a second orientation that is different from the first orientation.

29. A computer readable storage medium or media as in claim 11, wherein the image data of regions of the first and second visual images is presented in a color space that includes an intensity component.

30. A computer readable storage medium or media as in claim 29, wherein the intensity component is a Y component of the color space.

31. A computer readable storage medium or media as in claim 29, wherein the intensity component is a V component of the color space.

32. A computer readable storage medium or media as in claim 29, wherein the intensity component is an L component of the color space.

33. A computer readable storage medium or media as in claim 11, further comprising:
  computer code for performing a second process on the image data of each of the plurality of regions of the first visual image, wherein the second process is different from the first process;
  computer code for performing the second process on the image data of each of the plurality of regions of the second visual image;
  computer code for comparing the results of the second process performed on the image data of regions of the first visual image to the results of the second process performed on the image data of corresponding regions of the second visual image; and
  wherein the computer code for specifying the degree of similarity between the first and second visual images is further based on comparison of the results of the second process performed on corresponding regions of the first and second visual images.

34. A computer readable storage medium or media as in claim 17, wherein the perceptually uniform color space is a Munsell color space.

35. A computer readable storage medium or media as in claim 17, wherein the perceptually uniform color space is an L*a*b* color space.

36. A computer readable storage medium or media as in claim 17, wherein the transformation comprises an affine transformation of the visual image.

37. A computer readable storage medium or media as in claim 17, further comprising:
  computer code for performing a second process on the image data of each of the plurality of regions of the first visual image, wherein the second process is different from the first process;
  computer code for performing the second process on the image data of each of the plurality of regions of the second visual image;
  computer code for comparing the results of the second process performed on the image data of regions of the first visual image to the results of the second process performed on the image data of corresponding regions of the second visual image; and
  wherein the computer code for specifying the degree of similarity between the first and second visual images is further based on comparison of the results of the second process performed on corresponding regions of the first and second visual images.

38. A computer readable storage medium or media as in claim 24, wherein the computer code for comparing comprises computer code for comparing the results of the second process for the first visual image to the results of the second process for the second visual image.

39. A computer readable storage medium or media as in claim 24, wherein the computer code for comparing comprises computer code for comparing the results of the first and second processes for the first visual image to, respectively, the results of the first and second processes for the second visual image.

40. A computer readable storage medium or media as in claim 24, wherein the first process comprises measuring the error of each region with itself after a transformation of the visual image including the region.

41. A computer readable storage medium or media as in claim 24, wherein the transformation comprises an affine transformation of the visual image.

42. A computer readable storage medium or media as in claim 24, wherein the image data of regions of the first and second visual images is presented in a perceptually uniform color space.

* * * * *